United States Patent
Hong

(10) Patent No.: US 10,757,587 B2
(45) Date of Patent: Aug. 25, 2020

(54) METHODS FOR CONTROLLING SCELL STATE AND APPARATUSES THEREOF

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/236,640

(22) Filed: Dec. 31, 2018

(65) Prior Publication Data

US 2019/0208429 A1 Jul. 4, 2019

(30) Foreign Application Priority Data

Jan. 4, 2018 (KR) .................. 10-2018-0001224
Nov. 22, 2018 (KR) .................. 10-2018-0145158

(51) Int. Cl.
| | | |
|---|---|---|
| *H04W 24/02* | (2009.01) | |
| *H04W 16/32* | (2009.01) | |
| *H04W 24/10* | (2009.01) | |
| *H04W 84/04* | (2009.01) | |
| *H04L 5/00* | (2006.01) | |

(52) U.S. Cl.
CPC ............... *H04W 24/02* (2013.01); *H04L 5/00* (2013.01); *H04W 16/32* (2013.01); *H04W 24/10* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 8,462,688 | B1* | 6/2013 | Dinan | H04W 74/006 370/312 |
| 10,237,046 | B2* | 3/2019 | Zhang | H04L 5/001 |
| 2013/0188612 | A1* | 7/2013 | Dinan | H04W 72/042 370/336 |
| 2013/0229931 | A1* | 9/2013 | Kim | H04L 5/0053 370/252 |
| 2015/0334603 | A1* | 11/2015 | Uchino | H04L 5/001 370/331 |
| 2015/0373559 | A1 | 12/2015 | Hong | |

(Continued)

FOREIGN PATENT DOCUMENTS

| | | |
|---|---|---|
| KR | 10-2014-0102115 A | 8/2014 |
| KR | 10-2016-0110617 A | 9/2016 |
| KR | 10-2016-0134849 A | 11/2016 |

OTHER PUBLICATIONS

QUALCOMM Inc. et al., "Fast SCell activation for enhanced CA utilization", R2-1712255, 3GPP TSG-RAN2 Meeting #100, Reno, USA, Nov. 27-Dec. 1, 2017, pp. 1-8.

*Primary Examiner* — Lonnie V Sweet
(74) *Attorney, Agent, or Firm* — IP Legal Services, LLC

(57) ABSTRACT

Provided is a method of controlling states of a secondary cell by a user equipment. The method may include receiving SCell state indication information indicating a state for the SCell from a base station through an RRC message or a MAC control element, configuring the state of the SCell in an activation state or a dormant state on the basis of the SCell state indication information, and transmitting channel state information for the SCell to the base station in accordance with CQI configuration information configured for the SCell.

14 Claims, 14 Drawing Sheets

(56) References Cited

U.S. PATENT DOCUMENTS

| | | | |
|---|---|---|---|
| 2016/0255577 A1* | 9/2016 | Kazmi | H04W 72/1226 |
| | | | 370/311 |
| 2017/0181022 A1* | 6/2017 | Yang | H04B 7/0456 |
| 2018/0103424 A1 | 4/2018 | Kazmi et al. | |
| 2019/0274100 A1 | 9/2019 | Kazmi et al. | |

* cited by examiner

FIG.2

*RRCConnectionReconfiguration message*

```
SCellToAddMod-r10 ::=  SEQUENCE {
      sCellIndex-r10         SCellIndex-r10,
      ...
      sCellState-r15     ENUMERATED {activated, dormant}   OPTIONAL -- Need ON
}
```

FIG. 7

| Codepoint/Index | LCID value |
|---|---|
| 00000 | CCCH |
| 00001-01010 | Identity of the logical channel |
| 01011-01111 | Reserved |
| 10000 | Extended logical channel ID field |
| 10001 | Reserved |
| 10010 | Activation/Deactivation of PDCP Duplication |
| 10011 | Hibernation (1 octet) |
| 10100 | Hibernation (4 octets) |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

FIG.8

| Hibernation MAC control element $C_i$ | Activation/Deactivation MAC control element $C_i$ | SCell shall be |
|---|---|---|
| 0 | 0 | Deactivated |
| 0 | 1 | Activated |
| 1 | 0 | Reserved MAC control element combination |
| 1 | 1 | Dormant |

FIG.11

| | Operations for timeline |
|---|---|
| Timeline for Activation | [n + 8]<br>– Start CSI reporting<br>– Start sCellDeactivation timer |
| | [n + m], 8 < m < 24 or 34<br>– Start PHR reporting<br>– Start valid CSI reporting<br>– Transmit SRS<br>– Start PDCCH monitoring |
| Timeline for Dormant | [n + 8]<br>– Start CSI reporting<br>– Start Dormant to activation(or Dormant activation to deactivation) timer |
| | [n + m], 8 < m < 24 or 34<br>– Start PHR reporting<br>– Start valid CSI reporting |
| Timeline for Deactivation | [n + m], 8 < m < 24 or 34<br>– Stop sCellDeactivation timer<br>– Flush HARQ buffers<br>– Stop SRS transmission<br>– Stop UL-SCH<br>– Stop RACH<br>– Stop PDCCH monitoring |
| | [n + 8]<br>– Stop CSI reporting |

METHODS FOR CONTROLLING SCELL STATE AND APPARATUSES THEREOF

CROSS REFERENCE TO RELATED APPLICATION

This application claims priority from Korean Patent Application Nos. 10-2018-0001224 & 10-2018-0145158, filed on Jan. 4, 2018 & Nov. 22, 2018, which are hereby incorporated by reference for all purposes as if fully set forth herein.

BACKGROUND OF THE INVENTION

1. Field of the Invention

The present disclosure relates to configuring carrier aggregation to control the state of a secondary cell.

2. Description of the Prior Art

Studies on next generation mobile communication technologies have been in progress for satisfying demands for processing a large amount of data processing at a high-speed. For example, mobile communication systems have been employing technologies related to the 3rd generation partnership project (3GPP), such as Long Term Evolution (LTE), LTE-Advanced, 5G for transmitting and receiving a large amount of various types of data, such as video data, radio data, at a high speed.

As another method for satisfying the demand, carrier aggregation has been introduced. Such carrier aggregation enables a user equipment and a base station to transmit and receive data by aggregating a plurality of carriers.

However, in order to transmit and receive data through the carrier aggregation, a user equipment and a base station are required to perform a complex procedure, such as, operations of the user equipment for measuring the quality of a target carrier and reporting the measured quality to the base station and operations of the base station for selecting one or more carriers and determining the carrier aggregation.

In addition, when a secondary cell configured through the carrier aggregation triggers state transition from a deactivation state into an activation state, a related user equipment and base station perform a complex procedure and causes a certain time delay in transmitting/receiving data using the secondary cell after the state transition has been performed into the activation state.

Such a time delay degrades service satisfaction from a user and a network perspective.

SUMMARY OF THE INVENTION

To address such issues, the present disclosure is to provide a method and an apparatus for enabling a secondary cell to quickly perform state transition through a dormant state.

In addition, the present disclosure is to provide operations and procedures for controlling states for a secondary cell.

In accordance with an aspect of the present disclosure, a method of controlling states of a secondary cell by a user equipment, and an apparatus thereof are provided. The method includes: receiving SCell state indication information indicating a state for the SCell from a base station through an RRC message or a MAC control element; configuring the state of the SCell in an activation state or a dormant state on the basis of the SCell state indication information; and transmitting channel state information for the SCell to the base station in accordance with CQI configuration information configured for the SCell.

In addition, a method may be provided for controlling states of a secondary cell of a user equipment by a base station in accordance with an embodiment of the present disclosure. The method includes: transmitting secondary cell (SCell) state indication information indicating a state for a SCell to the user equipment through an RRC message or a MAC control element; and receiving channel state information for the SCell in accordance with CQI configuration information configured for the SCell when the state of the SCell is configured in an activation state or a dormant state on the basis of the SCell state indication information.

In addition, a user equipment may be provided for controlling states of a secondary cell by a user equipment according to an embodiment of the present disclosure The user equipment includes: a receiver configured to receive SCell state indication information indicating a state for the SCell from a base station through an RRC message or a MAC control element; a controller configuring the state of the SCell in an activation state or a dormant state on the basis of the SCell state indication information; and a transmitter configured to transmit channel state information for the SCell to the base station in accordance with CQI configuration information configured for the SCell.

In addition, a base station may be provided for controlling states of a secondary cell by a user equipment. The base station includes: a transmitter transmitting secondary cell (SCell) state indication information indicating a state for a SCell to the user equipment through an RRC message or a MAC control element; and a receiver receiving channel state information for the SCell in accordance with CQI configuration information configured for the SCell when the state of the SCell is configured in an activation state or a dormant state on the basis of the SCell state indication information.

According to the embodiments of the present disclosure, it is possible to remove unclearness of operations by defining a detailed method and signal for changing the state of a secondary cell including a dormant state.

BRIEF DESCRIPTION OF THE DRAWINGS

The above and other aspects, features and advantages of the present disclosure will be more apparent from the following detailed description taken in conjunction with the accompanying drawings, in which:

FIG. 2 is a diagram illustrating an radio resource control (RRC) message including SCell state indication information according to at least one embodiment of the present disclosure;

FIG. 7 is a diagram illustrating examples of logical channel identifier (LCID) values according to at least one embodiment of the present disclosure;

FIG. 8 is a diagram illustrating operations for determining a state of a SCell in the case of receiving all MAC CEs different from each other according to at least one embodiment of the present disclosure;

FIG. 11 is a diagram illustrating timing for receiving each of activation state indication information, dormant state indication information, and deactivation state indication information for a SCell according to at least one embodiment of the present disclosure;

DETAILED DESCRIPTION OF THE EXEMPLARY EMBODIMENTS

Figure 1:
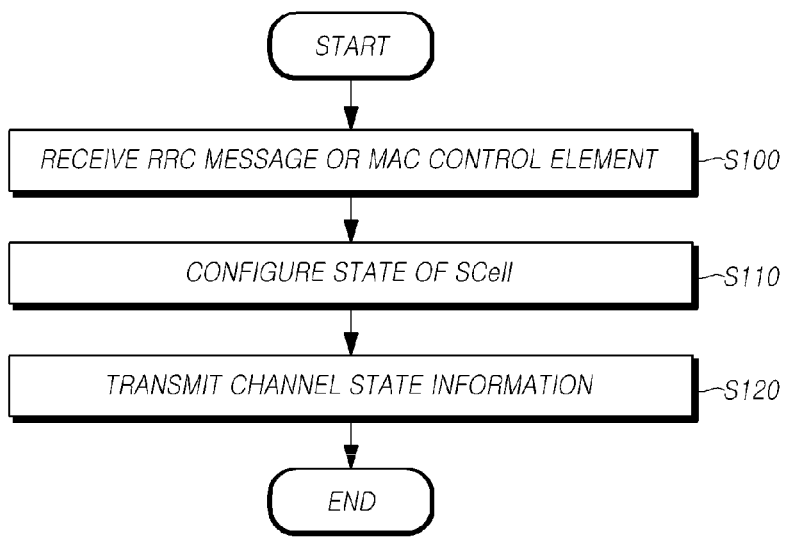
FIG. 1 is a flowchart illustrating operations of a user equipment (UE) according to at least one embodiment of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system may mean a system for providing various communication services such as a voice service and a packet data service. The wireless communication system may include a User Equipment (UE) and a Base Station (BS or an eNB).

The user equipment may be a comprehensive concept that indicates a terminal for use in wireless communication, including a UE (User Equipment) in wideband code division multiple access (WCDMA), long term evolution (LTE), high speed packet access (HSPA), international mobile telecommunication (IMT)-2020 (5G or New Radio), and the like, and a MS (Mobile station), a UT (User Terminal), an SS (Subscriber Station), a wireless device, and the like in global systems for mobile communication (GSM).

A base station or a cell may generally refer to a station where performs communication with a User Equipment (UE). The base station or the cell means, inclusively, all of various coverage areas such as a Node-B, an evolved Node-B (eNB), gNode-B (gNB), Low Power Node (LPN), a Sector, a Site, various types of antennas, a Base Transceiver System (BTS), an Access Point, a Point (e.g., transmitting point, receiving point, or transceiving point), a Relay Node, a Mega Cell, a Macro Cell, a Micro Cell, a Pico Cell, a Femto Cell, a Remote Radio Head (RRH), a Radio Unit (RU), and a Small Cell.

Each of the above mentioned various cells has a base station that controls a corresponding cell, and thus, the base station may be construed in two ways. 1) The base station may be a device that provides a megacell, a macrocell, a microcell, a picocell, a femtocell, and a small cell in association with a wireless area, or 2) the base station may indicate a wireless area itself. In 1), a base station may be all devices that interact with one another and are controlled by an identical entity to provide a predetermined wireless area or that cooperate each other to configure the wireless area. Based on a configuration type of a wireless area, the base station may be referred to as a point, a transmission/reception point, a transmission point, a reception point, or the like. In ii), a base station may be a wireless area itself where the terminal or the base station receives a signal from or transmits a signal to the other terminal or a neighboring base station.

In the present disclosure, a cell may refer to the coverage of a signal transmitted from a transmission/reception point, a component carrier having the coverage of the signal transmitted from the transmission/reception point (transmission point or transmission/reception point), or the transmission/reception point itself.

In the present disclosure, the user equipment and the base station are used as two (uplink or downlink) inclusive transceiving subjects to embody the technology and technical concepts described in the specifications, and may not be limited to a predetermined term or word.

Here, Uplink (UL) refers to a scheme for a UE to transmit and receive data to/from a base station, and Downlink (DL) refers to a scheme for a base station to transmit and receive data to/from a UE.

Uplink transmission and downlink transmission may be performed using i) a TDD (Time Division Duplex) scheme that performs transmission based on different times, ii) an FDD (Frequency Division Duplex) scheme that performs transmission based on different frequencies, or iii) a mixed scheme of the TDD and FDD schemes.

Further, a related standard may define configuring an uplink and a downlink based on a single carrier or a pair of carriers in a wireless communication system.

The uplink and the downlink may transmit control information through a control channel, such as a PDCCH (Physical Downlink Control CHannel), PUCCH (Physical Uplink Control CHannel), and the like. The uplink and the downlink may transmit data through as a data channel, such as PDSCH (Physical Downlink Shared CHannel), PUSCH (Physical Uplink Shared CHannel), and the like.

A downlink may refer to communication or a communication path from a multi-transmission/reception point to a terminal, and an uplink may refer to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, signal transmission and reception through a PUCCH, a PUSCH, a PDCCH, or a PDSCH, will be expressed as the transmission and reception of a PUCCH, a PUSCH, a PDCCH, or a PDSCH.

Meanwhile, higher layer signaling includes an radio resource control (RRC) signaling that transmits RRC information including an RRC parameter.

A base station performs downlink transmission to terminals. A base station may transmit a physical downlink control channel for transmitting i) downlink control information such as scheduling required to receive a downlink data channel that is a main physical channel for unicast transmission and ii) scheduling approval information for transmission on an uplink data channel Hereinafter, transmission and reception of a signal through each channel will be described as transmission and reception of a corresponding channel.

Varied multiple access schemes may be unrestrictedly applied to the wireless communication system. Various multiple access schemes may include TDMA (Time Division Multiple Access), FDMA (Frequency Division Multiple Access), CDMA (Code Division Multiple Access), OFDMA (Orthogonal Frequency Division Multiple Access), NOMA (Non-Orthogonal Multiple Access), OFDM-TDMA, OFDM-FDMA, OFDM-CDMA, and the like. Here, NOMA includes SCMA (Sparse Code Multiple Access), LDS (Low Cost Spreading), and the like.

Embodiment of the present disclosure may be applicable to resource allocation in an asynchronous wireless communication scheme that evolves into LTE/LTE-advanced and IMT-2020 through GSM, WCDMA, and HSPA and may be applicable to resource allocation in a synchronous wireless communication scheme that evolves into CDMA, CDMA-2000, and UMB.

In the present disclosure, a machine type communication (MTC) terminal refers to a terminal that is low cost (or is not very complexity), a terminal that supports coverage enhancement, or the like. Alternatively, in the present disclosure, the MTC terminal refers to a terminal that is defined as a predetermined category for maintaining low costs (or low complexity) and/or coverage enhancement.

In other words, in the present disclosure, the MTC terminal may refer to a newly defined 3GPP Release 13 low cost (or low complexity) UE category/type, which executes LTE-based MTC related operations. Alternatively, in the present disclosure, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type. Alternatively, the MTC terminal may refer to a further Enhanced MTC terminal defined in Relase-14.

In the specification, a NarrowBand Internet of Things (NB-IoT) user equipment denotes a user equipment that supports wireless access for cellular IoT. The purpose of the NB-IoT technology includes an improved indoor coverage, supporting a large amount of low-speed user equipments, low-delay responsiveness, a super-low user equipment cost, lower power consumption, and an optimized network structure.

Enhanced Mobile BroadBand (eMBB), Massive Machine Type Communication (mMTC), and Ultra Reliable and Low Latency Communication (URLLC) have been proposed as representative usage scenarios in New Radio (NR) that are being recently discussed in 3GPP.

In the present disclosure, a frequency, a frame, a subframe, a resource, a resource block, a region, a band, a subband, a control channel, a data channel, a synchronous signal, various reference signals, various signals and various messages that are associated with NR can be construed as various meanings that were used in the past, are used now, and will be used in the future.

Hereinafter, a method and an apparatus for aggregating carriers and controlling the state of a secondary cell according to embodiments of the present disclosure will be described.

In the present disclosure, a secondary cell denotes a cell providing an additional radio resource other than a primary cell (PCell) serving as a reference for RRC connection when a user equipment configures carrier aggregation. The secondary cell may be described as SCell, but the embodiments of the present disclosure are is not limited thereto. In addition, in the present disclosure, description or embodiments related to state changes of the SCell apply to a normal cell providing an additional radio resource, and may not apply to the PSCell, or a special cell.

In the present disclosure, an activation state denotes a state capable of transmitting/receiving data by performing operations of a normal secondary cell. A deactivation state denotes a state in which a secondary cell is configured on a user equipment, but a transmission or reception operation, or the like is not performed for the secondary cell. A dormant state is a state newly defined in accordance with at least one embodiment. The dormant state denotes a state in which some operations in the activation state and the deactivation state are mixed. The dormant state may be replaced by an arbitrary term, such as a fast activation state, dormant state, rapid activation state, mid activation state, low power activation state, high power deactivation state, new SCell state, mid power SCell state, mid state, mid activated state, semi activated state, semi deactivated state, or the like. Terms on states described above are just examples, and not limited thereto.

In the present disclosure, channel state information reporting includes information on channels measured, estimated or calculated by a user equipment and is described as CSI reporting, CQI reporting, or the like. This is for convenience of description, channel state information may include at least one of channel quality indicator (CQI), pre-coding matrix indicator (PMI), rank indicator (RI), procedure transaction identifier (PTI) and CSI-RS resource indicator (CRI), and the channel state information reporting denotes transmission of the channel state information. In addition, hereafter, if necessary, the channel state information reporting may be discussed using CSI reporting or CQI reporting, and should be construed as meaning including all of the channel state information described above except for a particular situation.

Carrier aggregation (CA) technology is a technique for boosting a data transmission rate for a user equipment through an additional carrier. Typical CA technology has not been optimized for the configuration of a SCell and an activation state for the SCell from latency perspective.

For example, a base station instructs a user equipment in an RRC connected state to perform a measurement configuration on a frequency of a candidate cell, which may be configured as a SCell on the user equipment, before configuring the CA. If the user equipment transmits a measurement report to the base station according to a reporting configuration, the base station additionally configures a SCell on the user equipment based on the received measurement report. When the SCell is configured on the user equipment, the SCell is configured to be in the deactivation state.

Thereafter, the base station may transmit user data by activating the SCell considering another measurement report, an amount of transmitted/received data, and the like for the corresponding cell.

If the SCell is in the deactivation state, the user equipment does not i) transmit SRS on the SCell, ii) transmit on UL-SCH on the SCell, iii) transmit on RACH on the SCell, iv) perform a channel quality indicator (CQI)/precoding matrix indicator (PMI)/rank indicator (RI)/procedure transaction identifier (PTI)/CSI-RS resource indicator (CRI)-report for the SCell, v) monitor the PDCCH on the SCell, and vi) perform PDCCH monitoring for the SCell.

If the SCell enters the activation state, normal operations of the SCell are performed. For example, a SCell in the activation state may perform operations, such as, SRS transmission, CQI/PMI/RI/PTI/CRI reporting for the SCell, PDCCH monitoring, PUCCH transmission, or the like.

A MAC control element (CE) is used to transition a typical SCell to the activation state. When receiving the MAC CE for activating a SCell in a subframe n, the user equipment shall be capable of applying SCell activation operations up to n+24 or n+34 subframes. Related timing specifications are as follows.

When a UE receives an activation command for a SCell in subframe n, the corresponding actions in 3GPP TS 36.321 shall be applied no later than the minimum requirement defined in [36.133] and no earlier than subframe n+8, except for the following:

the actions related to CSI reporting on a serving cell which is active in subframe n+8 the actions related to the sCellDeactivationTimer associated with the secondary cell These two operations shall be applied in subframe n+8.

the actions related to CSI reporting on a serving cell which is not active in subframe n+8

This operation shall be applied in the earliest subframe after n+8 in which the serving cell is active.

The minimum requirements defined in the relevant 3GPP TS36.133 are as follows.

In the case of SCell activation latency requirement, upon receiving SCell activation command in subframe n, the UE shall be capable of transmitting valid CSI report and applying actions related to the activation command as specified for the SCell being activated no later than in subframe n+24 provided the following conditions are met for the SCell:

During the period equal to max(5 measCycleSCell, 5 DRX cycles) before the reception of the SCell activation command:

the UE has sent a valid measurement report for the SCell being activated and the SCell being activated remains detectable according to the cell identification conditions specified in section 8.3.3.2, SCell being activated also remains detectable during the SCell activation delay according to the cell identification conditions specified in section 8.3.3.2.

Otherwise upon receiving the SCell activation command in subframe n, the UE shall be capable of transmitting valid CSI report and applying actions related to the activation command for the SCell being activated no later than in subframe n+34 provided the SCell can be successfully detected on the first attempt.

Thus, a considerable delay occurs until the UE becomes able to transmit data through a SCell after having received a MAC CE indicating SCell activation. That is, about 24 to 34 ms is consumed for performing effective data scheduling based on valid CQI reporting.

When a SCell in the deactivation state enters the activation state, a UE performs RF retuning, initial CQI measuring and CQI reporting. A method of reducing time for estimating and reporting initial valid CQI may be considered as one of methods for rapidly transitioning a SCell to the activation state. This method can be realized by the UE's measuring or reporting periodically (or non-periodically) the CQI for a configured SCell. However, the method is required to maintain the UE in the activation state, which causes power consumption. Accordingly, it is possible to quickly transition the SCell to the activation state and transmit data by defining a new state in which one or more of operations in the activation state causing power consumption is interrupted or not performed.

However, when a new state is defined in the SCell, it may be required to perform complicated operations, such as, transition between the new SCell state and the typical activation state, and transition between the new SCell state and the typical deactivation state. Further, no detailed method has been proposed in relation to this problem. In particular, since the new state (e.g., dormant state) also performs CQI reporting, power consumption is increased in comparison to the typical deactivation state. Therefore, a method that can effectively control this problem may be required.

As described above, in the typical CA technology, a considerable delay occurs until the UE becomes able to transmit user data through a cell additionally configured with carrier aggregation, after the UE in an idle state has transitioned into an RRC connected state and configured the carrier aggregation. In particular, a considerable delay occurs until the UE becomes able to transmit data through a SCell after having received a MAC CE indicating SCell activation. Such delay may be shortened by defining a new state in which one or more of operations in the activation state causing power consumption is not performed (or is stopped) and quickly changing the SCell into the activation state and transmitting data. However, no detailed method has been proposed in relation to this problem. In particular, since the new state also performs CQI reporting, power consumption is increased in comparison to the typical deactivation state.

In order to solve these problems, the present disclosure provides a detailed process and method for a UE to transmit data or transition to a deactivation state by controlling the state of a SCell after receiving indication information that indicates SCell activation. Further, the present disclosure provides a method of effectively controlling a new state that causes power consumption.

Meanwhile, for better understanding, hereinafter, at least one embodiment of the present disclosure will be described based on the LTE radio access technology. However, description or at least one embodiment discussed below may be applied to a fifth generation new radio (5G NR) or other radio access technologies as well as the LTE radio access technology. Hereinafter, description on well-known techniques will be omitted. The omitted description or some information elements shall refer to information elements specified in the RRC standard TS 36.331. In addition, with respect to operations of a UE, some operations include operations specified in the MAC standard TS 36.321. Even though description on operations of a UE related to the definitions of corresponding information elements is not included in this disclosure, the corresponding description may be included in the present disclosure or incorporated into claims.

A timer and a channel state information transmission configuration according to state transition among an activation state, a deactivation state, and a dormant state of a SCell are described on the basis of the operation of a UE. Various embodiments of SCell state indication information for indicating SCell states of a UE are also described.

A SCell dormant timer to be described below denotes a timer for instructing an associated SCell to transition from an activation state to a dormant state, but embodiments of the present disclosure are not limited thereto. Further, a SCell deactivation timer to be described below denotes a timer for instructing an associated SCell to transition from an activation state to a deactivation state, but the embodiments of the present disclosure are not limited thereto. Further, a dormant SCell deactivation timer to be described below denotes a timer for instructing an associated SCell to transition from a dormant state to a deactivation state, but the embodiments of the present disclosure are not limited thereto.

FIG. 1 is a flowchart illustrating operations of a UE according to at least one embodiment of the present disclosure.

Referring to FIG. 1, a UE may perform operations of receiving SCell state indication information from a base state through an RRC message or a MAC control element (S100). The SCell state indication information may indicate the state of the SCell.

For example, the UE can receive SCell state indication information through higher layer signaling or a MAC CE. The higher layer signaling may denote an RRC message. The higher layer signaling and the MAC CE may be received depending on a situation such as whether the UE configures a SCell.

In one example, the SCell state indication information may be contained in an RRC connection reconfiguration message that the UE receives for configuring a SCell. For example, the SCell state indication information received through the RRC message may include a 1-bit parameter indicating one of the activation state and the dormant state. If configuration information for configuring the SCell is contained in the RRC message, but a parameter for the SCell state indication information is not contained in the configuration information, the UE may configure the SCell to be in the deactivation state. Thereafter, the UE may control a state of the SCell according to SCell state indication information received through the MAC CE.

As another example, after having configured the SCell, the UE may dynamically receive state indication information for the SCell through the SCell state indication information by the MAC CE. For example, the MAC CE including the SCell state indication information may have a format including a field for indicating a state for the SCell as the activation state or the dormant state for each SCell index. As another example, the MAC CE including the SCell state indication information may be formed in a format including a field for indicating a state for the SCell as the activation state or the deactivation state for each SCell index.

In other words, the MAC CE may be divided into i) a first MAC CE configured to indicate a state for each SCell index as the activation state or the deactivation state and ii) a second MAC CE configured to indicate a state for each SCell index as the dormant state or the activation state. In this case, the first MAC CE and the second MAC CE are identified by one or more MAC PDU subheaders having logical channel IDs (LCID) different from each other. For example, the first MAC CE may be identified by a MAC PDU subheader having an activation or deactivation LCID value. The second MAC CE may be identified by a MAC PDU subheader having a hibernation LCID value. Thus, the first MAC CE and the second MAC CE are arbitrary terms for dividing the MAC CE, and not limited thereto. That is, the first MAC CE may be described as an activation/deactivation MAC CE, and the second MAC CE may be described as a hibernation MAC CE.

Operations for receiving and processing messages according to each situation will be described in detail below with reference to the drawings.

Meanwhile, the UE may perform a control operation for controlling the state of a SCell to one of the activation state and the dormant state on the basis of the SCell state indication information (S110).

For example, when the SCell state indication information indicates an activation state, the UE may configure the SCell to be in the activation state. Further, when the UE configures the SCell to be in the activation state and a SCell dormant timer is configured in association with the SCell, the UE may start or restart the SCell dormant timer. Further, when the SCell dormant timer associated with the SCell is expired, the UE may change the state of the SCell into a dormant state. When the state of the SCell is changed into the dormant state by expiration of the SCell dormant timer, the UE may stop a SCell deactivation timer associated with the SCell.

As another example, when the SCell state indication information indicates the dormant state, the UE may configure the SCell to be in the dormant state. Further, when the UE configures the SCell to be in the dormant state, the UE may stop the SCell deactivation timer associated with the SCell. Further, when the UE controls the SCell to be in the dormant state and a dormant SCell deactivation timer is configured in association with the SCell, the UE may start or restart the dormant SCell deactivation timer.

Meanwhile, the dormant SCell deactivation timer may not apply to a SCell set to transmit a control channel to an uplink. For example, the dormant SCell deactivation timer may not apply to a PUCCH SCell. This is because the PUCCH SCell is set to transmit uplink control information, so it is effective not to transition to the deactivation state.

In summary, when the UE configures the SCell to be in the activation state, the UE may start or restart the SCell dormant timer associated with the SCell. When the SCell dormant timer is expired, the UE may change the corresponding SCell into the dormant state and may stop the SCell deactivation timer and the SCell dormant timer. Further, when the UE configures the SCell in the dormant state, the UE may change the state of the SCell into the deactivation state in accordance with the operation of the timer in the dormant state by starting or restarting the dormant SCell deactivation timer that is distinct from the SCell dormant timer and the SCell deactivation timer.

As described above, it is possible to prevent unnecessary power consumption even though there is no clear state transition message from a base station by transiting the state of the SCell in accordance with the timers. Further, unnecessary message transmission/reception in the entire system is prevented, so network load can be reduced.

The UE can perform operations for transmitting channel state information for the SCell to a base station in accordance with CQI configuration information configured for the SCell (S120).

The UE may transmit channel state information on the basis of various periods and offset to the base state in accordance with the CQI configuration information in each state.

For example, when the SCell is configured in an activation state and when first CQI configuration information for the SCell is configured in the UE, the UE may transmit channel state information for the SCell to the base station by applying the value of a first activation state CQI report parameter contained in the first CQI configuration information.

As another example, when the SCell is configured in an activation state and when first CQI configuration information is not configured in the UE, the UE may transmit channel state information for the SCell to the base station by applying the value of a second CQI report parameter contained in the second CQI configuration information.

At least one of the first CQI configuration information and the second CQI configuration information may be configured in the UE through higher layer signaling (e.g., an RRC message). Further, the first CQI configuration information and the second CQI configuration information include different CQI report periods and offset values, and the CQI report period contained in the first CQI configuration information may be set as a shorter value than the CQI report period contained in the second CQI configuration information. For example, the first CQI configuration information may denote cqi-ShortConfigSCell information, and the second CQI configuration information may denote cqi-ReportConfigSCell information. Both the cqi-ShortConfigSCell information and the cqi-ReportConfigSCell information denote information elements on an RRC message. However, the embodiments of the present disclosure are not limited thereto.

When the UE transmits the channel state information in accordance with the first CQI configuration information and when the first CQI configuration information is expired, the UE may transmit channel state information in accordance with the second CQI configuration information. For example, when the number of a subframe receiving SCell state indication information indicating an activation state for the SCell is n, the first CQI configuration information may be expired at a transmission time interval (TTI) including the n+34 subframe. In this case, the UE may transmit the channel state information in the activation state to the base station in accordance with the second CQI configuration information.

As another example, when the SCell is configured in a dormant state, the UE may transmit the channel state information for the SCell to the base station in accordance with a CQI report parameter value contained in dormant state CQI configuration information distinct from the first CQI configuration information and the second CQI configuration information that is applied in the activation state.

In summary, the UE may transmit channel state information to the base station by applying one of i) the first CQI configuration information in which the channel state information transmission period is set to be short, ii) the second CQI configuration information set with a transmission period longer than the first CQI configuration information, and iii) the dormant state CQI configuration information that is applied in the dormant state. Which CQI configuration the UE uses may be determined by various rules described above and it is required to define a new operation by additionally defining the dormant state.

Hereinafter, various methods for a UE to receive SCell state indication information and a method for a UE to transition or initially configure the state of a SCell in accordance with the methods are described with reference to drawings.

FIG. 2 is a diagram illustrating an RRC message including SCell state indication information according to at least one embodiment of the present disclosure.

Referring to FIG. 2, the UE may receive an RRC connection reconfiguration message including configuration information indicating a configuration of a SCell from the base station. In this case, SCell state indication information may be contained in the SCell configuration information as its one parameter. For example, the SCell state indication information may include a 1-bit parameter for indicating a state for a SCell configured or to be configured additionally as the activation state or the dormant state.

Through this, the UE may configure an initial state for a SCell to be configured by checking SCell state indication information (e.g., sCellState-r15). The specific operations will be described below with reference to FIG. 3.

Figure 3:
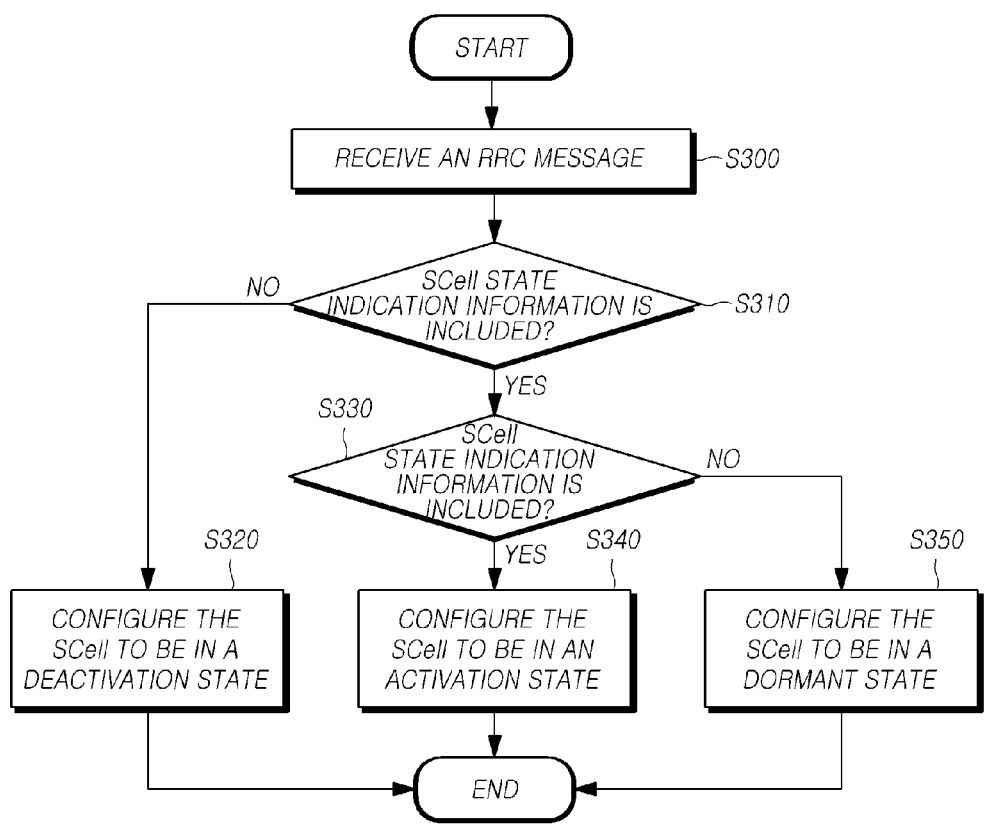
FIG. 3 is a flowchart illustrating operations controlling a state of a secondary cell (SCell) through an RRC message according to at least one embodiment of the present disclosure.

FIG. 3 is a flowchart illustrating operations controlling a state of a SCell through an RRC message according to at least one embodiment of the present disclosure.

Referring to FIG. 3, a UE receives an RRC message for adding or configuring a SCell from a base station (S300). For example, a network may instruct a configured SCell to be in or to transition into the dormant state. To do this, the network (base station) may use the RRC message.

In one example, the configured SCell may be caused to be in the deactivation state when the SCell is added/configured or in an initial stage after a handover has been performed. As another example, the UE may receive an RRC connection reconfiguration message containing SCell state indication information indicating the SCell activation state for the SCell from the base station, to enable the UE to transmit user data rapidly through the configured SCell. In this case, the UE may configure the corresponding SCell to be in the activation state when the SCell is added/configured or in an initial stage after a handover has been performed. As further another example, the UE may receive an RRC connection reconfiguration message containing information indicating the dormant state for the SCell from the base station, to enable the configured SCell to transition into the SCell activation state rapidly. In this case, the UE may configure the corresponding SCell to be in the dormant state when the SCell is added/configured or in an initial stage after a handover has been performed.

For the above operations, if an RRC message is received, the UE determines whether SCell state indication information is contained in that (S310).

In an example, the SCell state indication information may be contained in common SCell configuration information (e.g., commonSCellconfig) applied to a specific group of SCells, as its one information element. Thus, the SCell state indication information may be applied to the specific SCell group. As another example, the SCell state indication information may contained in SCell configuration information (e.g., SCellToAddMod) applied to individual SCells, as its one information element. Thus, the SCell state indication information may be applied to a specific SCell.

Meanwhile, the SCell state indication information may be configured of 2 bits and represent a value indicating one of the dormant state, the activation state, and the deactivation state for a corresponding SCell. In the case where the SCell state indication information is configured of 2 bits, one value can be kept as a spare value. For example, the SCell state indication information may include SCellstate ENUMERATE {activate, deactivate, dormant, spare}.

As another example, the SCell state indication information may be configured of 1 bit and represent a value indicating one of the dormant state and the activation state for a corresponding SCell. For example, the SCell state indication information may include SCellstate ENUMERATE {activate, dormant} or SCellstate ENUMERATE {TRUE(activate), FALSE(dormant)}. In this case, the corresponding information element (e.g. SCellstate) may be set as an optional information element. Accordingly, when the SCell state indication information is not contained in the SCell configuration information, the SCell may be configured to be in the deactivation state when the SCell is added/configured or in an initial stage after a handover has been performed, as in the typical system (S320).

When the SCell state indication information is contained, the UE may determine whether the SCell state indication information indicates the activation state (S330). When the SCell state indication information is set to a value indicating the activation state, the UE configures the corresponding SCell to be in the activation state (S340).

Meanwhile, when the SCell state indication information is not set to a value indicating the activation state, that is, set to a value indicating the dormant state, the UE configures the corresponding SCell to be in the dormant state (S350).

For example, when an RRC message containing information indicating the dormant state for a SCell is received, the UE does not transmit SRS on the SCell. In addition, the UE does not transmit information through UL-SCH on the corresponding SCell. In addition, the UE does not transmit information through RACH on the corresponding SCell. In addition, the UE does not monitor PDCCH on the corresponding SCell. In addition, the UE does not transmit PUCCH on the corresponding SCell. If a SCell deactivation timer (sCellDeactivationTimer) associated with the corresponding SCell is in operation, the UE stops/interrupts it. In addition, the UE flushes all HARQ buffers associated with the corresponding SCell. In addition, the UE stops/interrupts a SCell deactivation timer (sCellDeactivationTimer) associated with the corresponding SCell, and flushes all HARQ buffers associated with the corresponding SCell.

However, the UE may transmit channel state information for the corresponding SCell in accordance with a period indicated by a periodic CQI reporting configuration (e.g., period information, CQI PUCCH resource information, CQI format indication information, or one or more pieces of parameter information capable of calculating period information) in the dormant state. The channel state information contains CQI/PMI/RI/PTI/CRI.

Thus, when configuring a SCell, the UE may determine a state of the SCell configured or to be configured based on SCell state indication information and control the states of the SCell.

Meanwhile, the UE may change a state of the configured SCell based on a MAC CE received from a base station.

Figure 4:
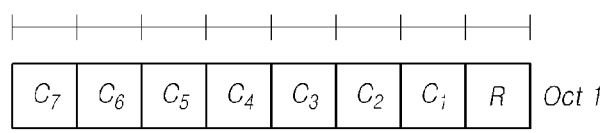
FIG. 4 is a diagram illustrating a format of a MAC control element (CE) according to at least one embodiment of the present disclosure.
Figure 5:
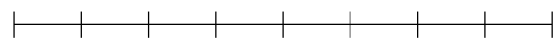
FIG. 5 is a diagram illustrating a format of a MAC CE according to another embodiment of the present disclosure.

FIG. 4 is a diagram illustrating a format of a MAC control element (MAC CE) according to at least one embodiment of the present disclosure. FIG. 5 is a diagram illustrating a format of a MAC CE according to another embodiment of the present disclosure.

Referring to FIGS. 4 and 5, MAC control elements (MAC CE) may be configured in a format including fields for indicating a state for the SCell as the activation state or the dormant state for each SCell index.

Each format is configured of a reserve bit (R) and bits (Ci) separated by an index of each cell. In the case of FIG. 4, up to 7 SCell indexes may be indicated, and in the case of FIG. 5, up to 31 SCell indexes may be indicated. Specifically, the MAC CE of one octet is identified by a MAC PDU subheader. The MAC CE has a fixed size and is configured of a single octet containing 7 C fields and one R field. The MAC CE of 4 octets is identified by a MAC PDU subheader. The MAC CE has a fixed size and is configured of 4 octets containing 31 C fields and one R field.

The UE may check an index of the corresponding SCell, check a bit value of the corresponding index, and then determine whether to transition a state of the SCell.

In one example, if a value of an index field for the SCell is set to a value indicating the activation state, and a state of the SCell is the dormant state, the UE may transition the state of the SCell to the activation state.

As another example, when a value of an index field of the SCell is set to a value indicating the activation state, and a state of the SCell is not the dormant state, the UE may ignore the index field value and maintain a state at the time of receiving the MAC CE.

Figure 6:
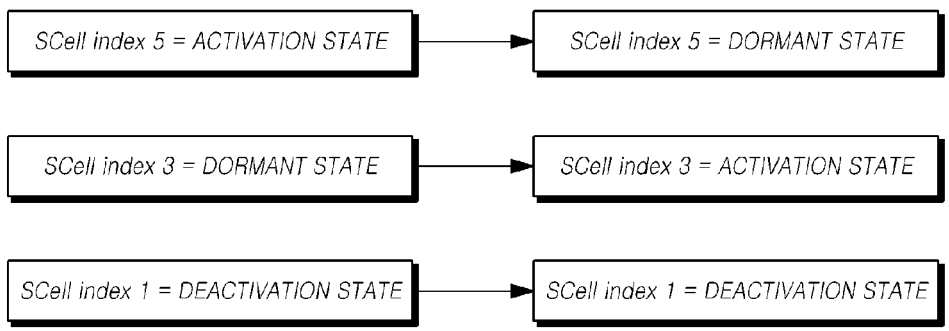
FIG. 6 is a diagram illustrating a procedure of changing a state of a SCell according to a MAC CE including SCell state indication information according to at least one embodiment of the present disclosure.

FIG. 6 is a diagram illustrating a procedure of changing a state of a SCell according to a MAC CE including SCell state indication information according to at least one embodiment of the present disclosure.

Referring to FIG. 6, a MAC CE of one octet is applied when no serving cell index (ServCellIndex) is greater than 8. Otherwise, a MAC CE of 4 octets is applied. Here, if there is a SCell configured with a SCell index (SCellIndex) i, this corresponding Ci field indicates a state of a SCell configured with the SCellIndex i. Otherwise, the MAC entity shall ignore the Ci field.

For example, only the values of the fields C1, C3, and C5 are exemplarily described. It is assumed that SCell index 1 (C1) is in the deactivation state, SCell index 3 (C3) is in the dormant state, and SCell index 5 (C5) is in the activation state, at the time of receiving the MAC CE.

The Ci field is set to 1 to indicate that a SCell having the SCellIndex i is required to transition to the dormant state. The Ci field is set to 0 to indicate that a SCell having the SCellIndex i is required to be activated. The R field is set to 0 as a reserved bit.

When receiving a MAC CE, the UE determines state transition using i) the current state of a SCell having the corresponding SCell index and ii) an indication value indicated by the MAC CE.

In one example, when a value of an index field for a SCell is set to a value indicating the activation state (ex, "0"), and a state of the SCell is the dormant state, the UE may transition the state of the SCell to the activation state. That is, since C3 is set to 0, the UE transitions the SCell having SCell index 3 in the dormant state to the activation state.

As another example, when a value of an index field for a SCell is set to a value indicating the activation state (ex, "0"), and a state of the SCell is not the dormant state, the UE ignores the index field value. That is, even though C1 is set to 0, since the SCell having SCell index 1 is not in the dormant state, the UE maintains the corresponding SCell in the deactivation state.

As another example, when a value of an index field for a SCell is set to a value indicating the dormant state (ex, "1"), the UE transitions the state of the SCell to the dormant state. That is, since C5 is set to 1, the UE transitions the SCell having SCell index 5 to the dormant state.

In this way, the UE controls a state for the SCell based on the MAC CE including information indicating as either the activation state or the dormant state.

However, as described above, the MAC CE may be divided into a MAC CE including fields indicating the activation state or the dormant state, and a MAC CE including fields indicating the activation state or the deactivation state.

FIG. 7 is a diagram illustrating examples of logical channel identifier (LCID) values according to at least one embodiment of the present disclosure.

Referring to FIG. 7, a MAC CE is divided into a first MAC CE configured to indicate a state for each SCell index as the activation state or the deactivation state and a second MAC CE configured to indicate a state for each SCell index as the dormant state or the activation state. The first MAC CE and the second MAC CE may be identified by MAC PDU subheaders having logical channel IDs (LCIDs) different from each other.

For example, a MAC CE for indicating a state of a SCell as the activation or deactivation state is identified by a MAC PDU subheader having an LCID value of 11000 or 11011. For example, a MAC CE for indicating a state of a SCell as the activation or dormant state is identified by a MAC PDU subheader having an LCID value of 10011 or 10100. In this way, each of the first MAC CE and the second MAC CE is identified by MAC PDU subheaders having LCIDs different from each other. Also, each of the first MAC CE and the second MAC CE may be identified by different LCID values from each other according to MAC CE octet(s).

Meanwhile, as described above, it is possible to define two types of MAC CE indicating a state of a SCell, except for the division based on the octet. For example, it is possible to define a MAC CE for indicating the activation state or the deactivation state.

The MAC CE for indicating the activation state or the deactivation state may be configured in the same field formats as those shown in FIGS. 4 and 5 according to the octet(s). In this case, as described above, the MAC CE is divided according to values of MAC PDU subheader. For example, the activation/deactivation MAC CE of one octet is applied when no serving cell index (ServCellIndex) is greater than 8. Otherwise, the activation/deactivation MAC CE of 4 octets is applied. Here, if there is a SCell configured with a SCell index (SCellIndex) i, this corresponding Ci field indicates the activation/deactivation state of a SCell configured with the SCellIndex i. Otherwise, the MAC entity shall ignore the Ci field. The Ci field is set to 1 to indicate that a SCell having the SCellIndex i is required to be activated. The Ci field is set to 0 to indicate that a SCell having the SCellIndex i is required to be deactivated. The R field is set to 0 as a reserved bit.

Therefore, the UE is requires to assume a case that receives both a MAC CE indicating the activation state or the deactivation state and a MAC CE indicating the activation state or the dormant state. In a case where a single MAC CE is received, the UE identifies it based on a subheader of a MAC PDU including the MAC CE, and determines whether to trigger state transition according to the field value and a state of the corresponding SCell. However, in a case where two MAC CEs are received, a rule is needed for confirming state transition instruction for the SCell.

FIG. 8 is a diagram illustrating operations for determining a state of a SCell in the case of receiving all MAC CEs different from each other according to at least one embodiment of the present disclosure.

When both the first MAC CE and the second MAC CE are received, the UE determines a value indicated by SCell state indication information based on the combination of index field values for the SCell included in each of the first MAC CE and the second MAC CE.

Referring to FIG. 8, the hibernation MAC CE denotes the second CE indicating the activation state or the dormant state, and the Activation/Deactivation MAC CE denotes the first CE indicating the activation state or the deactivation state.

The values of the individual SCell index fields in each MAC CE may be set to 0 or 1. In this case, a state of the corresponding SCell may be transitioned to the deactivation, activation or dormant state, depending on the combination of a specific SCell index field value set in each MAC CE, as shown in FIG. 8.

For example, when the field value for a specific SCell index of the second CE is 0, and the field value for the same specific SCell index of the first CE is 0, then the corresponding SCell shall be caused to be in the deactivation state. Likewise, when the field value of the second CE is 0 and the field value of the first CE is 1, the corresponding SCell shall be caused to be in the activation state. In addition, when the field value of the second CE is 1 and the field value of the first CE is 1, the corresponding SCell shall be caused to be in the dormant state. A state where the field value of the second CE is 1 and the field value of the first CE is 0 has been reserved and may be utilized in future.

Meanwhile, when it is determined that a state for a specific SCell is the dormant state, the UE's MAC entity does not transmit SRS on the corresponding SCell.

The UE reports CQI/PMI/RI/PTI/CRI for the corresponding SCell in accordance with a period indicated by a periodic CQI reporting configuration (e.g., period information, CQI PUCCH resource information, CQI format indication information, or one or more pieces of parameter information capable of calculating period information) in the dormant state. In addition, the UE does not transmit information through UL-SCH on the corresponding SCell. In addition, the UE does not transmit information through RACH on the corresponding SCell. In addition, the UE does not monitor PDCCH on the corresponding SCell. In addition, the UE does not transmit PUCCH on the corresponding SCell.

If a SCell deactivation timer (sCellDeactivationTimer) associated with the corresponding SCell is in operation, the UE stops/interrupts it. The UE flushes all HARQ buffers associated with the corresponding SCell. As another example, the UE stops/interrupts the SCell deactivation timer (sCellDeactivationTimer) associated with the SCell when the SCell transitions from the activation state to the dormant state. The UE flushes all HARQ buffers associated with the corresponding SCell.

As described above, the UE may configure a SCell state of the UE by receiving SCell state indication information and analyzing it in various methods.

Meanwhile, the dormant state also consumes more power than the deactivation state. Accordingly, when the UE does not need to transmit data anymore in the dormant state or when the wireless quality received through CQI reporting is deteriorated, the base station may transition the state of the SCell to the deactivation state.

As an example for this, as described above, the base station may instruct a SCell to be in the deactivation state by transmitting a MAC CE for clearly instructing the SCell to be in the activation state or the deactivation state. However, this may cause a problem that increases system load because the base station transmits specific signaling to the UE.

Therefore, as described with reference to FIG. 1, an operation that prevents an increase in system load and transitions the state of a SCell to the dormant state or the deactivation state is also required. Hereinafter, an implicit state transition method using not clear signaling, but a timer is described again with reference to drawings.

Figure 9:
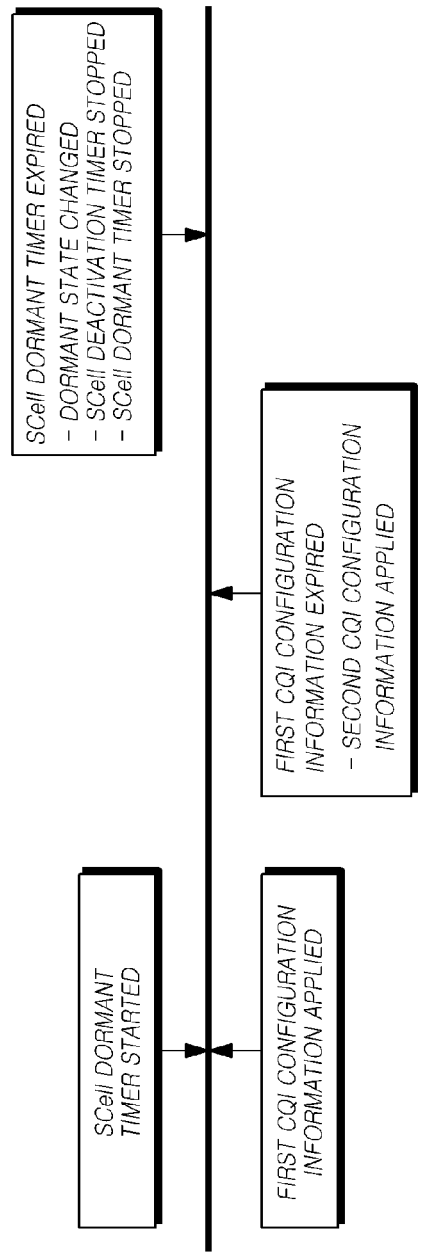
FIG. 9 is a diagram illustrating operations according to time of a related timer and channel quality indicator (CQI) configuration information when the SCell of a UE is controlled in the activation state according to at least one embodiment of the present disclosure.

FIG. 9 is a diagram illustrating operations according to time of a related timer and CQI configuration information when the SCell of a UE is controlled in the activation state according to at least one embodiment of the present disclosure.

Referring to FIG. 9, the SCell of a UE may be configured in the activation state by various methods. For example, the SCell of a UE may be configured in the activation state by the RRC message or the MAC CE described above.

In this case, the UE may start a SCell dormant timer. If the SCell dormant timer of the SCell configured in the activation state is expired, the SCell may transition to the dormant state. In addition, a SCell deactivation timer associated with the SCell may be stopped, and the SCell dormant timer may also be stopped. If necessary, the dormant SCell deactivation timer configured in association with the SCell transitioned to the dormant state may be started. That is, when the SCell transitions to the dormant state, the SCell deactivation timer may be stopped and a specifically defined dormant SCell deactivation timer may be applied and started.

In respect of CQI configuration information for CQI reporting, when the SCell is configured in the activation state, the UE may check whether first CQI configuration information was configured in association with the SCell. If so, the UE may transmit channel state information by applying the first CQI configuration information. If the CQI configuration information is expired, the UE may perform channel state information transmission in the activation state by applying a second CQI configuration information. The first CQI configuration information includes a transmission period parameter set with a shorter period than the second CQI configuration information.

Figure 10:
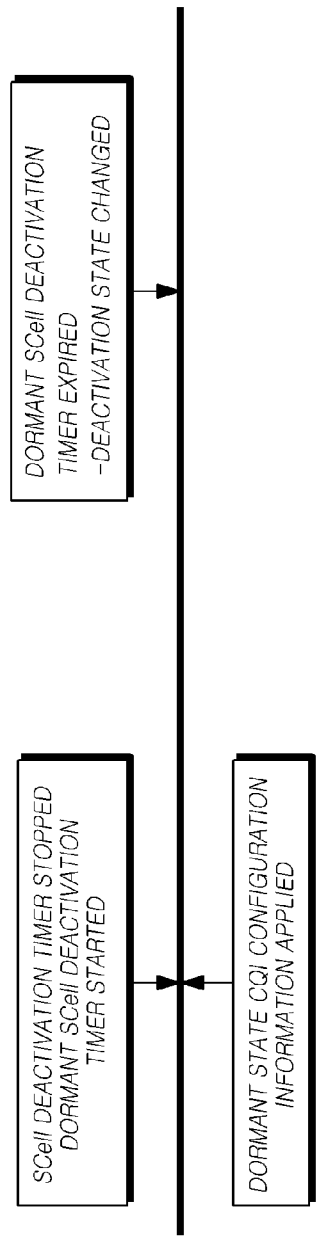
FIG. 10 is a diagram illustrating operations according to time of a related timer and CQI configuration information when the SCell of a UE is controlled in the dormant state according to at least one embodiment of the present disclosure.

FIG. 10 is a diagram illustrating operations according to time of a related timer and CQI configuration information when the SCell of a UE is controlled in the dormant state according to at least one embodiment of the present disclosure.

Referring to FIG. 10, the SCell of a UE may be configured in the dormant state by various methods. For example, the SCell of a UE may be configured in the activation state by the RRC message or the MAC CE described above. In addition, the SCell may be configured in the dormant state in accordance with expiration of the SCell dormant timer described above.

In this case, the UE may start a dormant SCell deactivation timer. In addition, the UE may stop the SCell deactivation timer. This is because the SCell deactivation timer is a timer for transiting the state of a SCell from the activation state to the deactivation state and this is for preventing a collision with the dormant SCell deactivation timer set to transition to the deactivation state from the dormant state.

If the dormant SCell deactivation timer of the SCell configured in the dormant state is expired, the SCell may transition to the deactivation state.

Meanwhile, in respect of CQI configuration information for CQI reporting, when the SCell is configured in the dormant state, the UE may transmit channel state information by applying dormant state CQI configuration information specifically defined and configured in the terminal to be applied in the dormant state. The dormant state CQI configuration information may denote specific configuration information that is distinct from the first CQI configuration information and the second CQI configuration information configured to the applied in the activation state described above.

FIG. 11 is a diagram illustrating timing for receiving each of activation state indication information, dormant state indication information, and deactivation state indication information for a SCell according to at least one embodiment of the present disclosure.

Referring to FIG. 11, description will be given for operations performed by a UE in terms of timing when a MAC CE including SCell state indication information indicating each state is received will be described.

In one example, when receiving a MAC CE indicating the dormant state, the UE may perform CSI reporting at time point n+8 (or after the time point n+8 or at a first period after the time point n+8) from time point n when a corresponding MAC CE message is received. The UE may start or restart an associated timer.

As another example, when receiving a MAC CE indicating the dormant state, the UE may perform periodic CSI reporting after time point n+8 from time point n when a corresponding MAC CE message is received and before time point n+24 or n+34. The UE may start or restart an associated timer.

As another example, when receiving a MAC CE indicating the dormant state, the UE may perform periodic CSI reporting before time point n+24 or n+34 from time point n when a corresponding MAC CE message is received. The UE may start or restart an associated timer.

As another example, when receiving an RRC connection reconfiguration message including information indicating the dormant state, the UE may perform periodic CSI reporting at time point n+8 from i) the time point when the RRC connection reconfiguration message is received, ii) the time point when the RRC connection reconfiguration message is processed and decoded, or iii) the time point when an RRC connection reconfiguration completion message is transmitted. The UE may start or restart an associated timer.

As another example, when receiving an RRC connection reconfiguration message including information indicating the dormant state, the UE may perform periodic CSI reporting before time point n+24 or n+34 from the time point when the RRC connection reconfiguration message is received. The UE may start or restart an associated timer.

As another example, when receiving an RRC connection reconfiguration message including information indicating the dormant state, the UE may perform periodic CSI reporting at time point n+8 from the time point when the decoding of the RRC connection reconfiguration message is completed. The UE may start or restart an associated timer.

As another example, when receiving an RRC connection reconfiguration message including information indicating the dormant state, the UE may perform periodic CSI reporting at the time point when an RRC connection reconfiguration completion message is transmitted. The UE may start or restart an associated timer.

As another example, when receiving an RRC connection reconfiguration message including information indicating the dormant state, the UE may perform periodic CSI reporting at the time point when an offset parameter(s) indicated by a base station (being contained in the RRC connection reconfiguration message) is applied based on a time point when an RRC connection reconfiguration completion message is transmitted. The UE may start or restart an associated timer.

As another example, when receiving an RRC connection reconfiguration message including information indicating the dormant state, the UE may perform CSI reporting at the first period of periodic CSI reporting from the time point when an RRC connection reconfiguration completion message is transmitted. The UE may start or restart an associated timer.

As another example, when receiving an RRC connection reconfiguration message including information indicating the dormant state, the UE may perform periodic CSI reporting at an earliest time point from the time point when an RRC connection reconfiguration completion message is transmitted. The UE may start or restart an associated timer. In this case, the earliest time point shall be within time point n+24 or n+34 from the time point when the RRC reconnection message is received or when the decoding of the RRC connection reconfiguration message is completed.

As described above, when receiving the SCell state indication information indicating the dormant state, the UE transmits the channel state information to the base station at a specific time.

Hereinafter, a method of a UE will be described for rapidly transmitting data through a SCell by reducing time for estimating and reporting an initial valid CQI, after having received information indicating the activation state for a SCell through the activation/deactivation MAC CE.

SCell activation delay is caused by CQI computation delay (4~6 ms), time for waiting valid resources for CSI measurement report, time for RF re-tuning, and the like.

A UE can perform CSI reporting when it reaches n+8 after the time (n) when an activation command is received. Therefore, if the UE is allowed to inform the network that it is ready to use an activated SCell by transmitting an UL signal in a short period of time, it is possible to reduce delay in activating the SCell to transmit data.

When an UL resource is allowed/assigned in a corresponding SCell, the UE transmits CQI reporting to the BASE STATION in a short period of time.

The base station may enable a CQI reporting resource of a short period to be available to the UE when a SCell activation command is received.

To do this, the UE may be configured with a specific CQI resource on the SCell. As another example, the UE may be configured with a specific CQI resource for the corresponding SCell on the PCell. As another example, the UE may be configured with a specific CQI resource for the corresponding SCell on a PUCCH SCell. The base station may provide information on a specific CQI resource, which is contained in the RRC connection reconfiguration message, to the UE.

When receiving a SCell activation command, the UE transmits a CQI report (for convenience of description, CQI reporting is used and also includes a channel quality indicator (CQI) report, a precoding matrix indicator (PMI) report, a rank indicator (RI) report, a procedure transaction identifier (PTI) report, and a CSI-RS Resource Indicator (CRI) report) through the PCell or another SCell or PUCCH SCell, to indicate that the corresponding SCell has been activated. Alternatively, the UE may report through the SCell in the activation state.

To avoid a load on a PUCCH resource, the short period of the CQI reporting resource shall be available only when a SCell activation command is received. However, if the UE transmits CQI reporting through the PUCCH, load may be caused because the PUCCH resource is continuously used when the SCell activation command is received.

To solve this problem, it is necessary for the UE to perform switching/fallback/conversion in a normal period (or a period set longer than a short period for indicating/informing SCell activation to the base station)

In one example, when a UE receives a SCell activation command (if a MAC CE indicating SCell activation is received), i) a CQI configuration having a short CQI reporting period (for valid CQI reporting) and ii) a CQI configuration having a CQI reporting period of a normal period (or a period longer than a short period for indicating/informing the SCell activation to the BASE STATION) in the activation state may be configured on the UE through the RRC connection reconfiguration message. That is, as described above, the base station may configure, on the UE, a short CQI report period parameter by new CQI configuration information and a common CQI report period parameter by a typical a CQI configuration information in order to rapidly transmit channel state information of the activation state.

As another example, when the UE receives a MAC CE indicating SCell activation, a CQI configuration having a short CQI reporting period (for valid CQI reporting) may include one or more pieces of information for indicating i) a CQI reporting start offset for corresponding CQI reporting, ii) a corresponding CQI reporting period (e.g., 1 ms), and iii) number of repetitions of corresponding CQI reporting. The CQI reporting period may be pre-configured with a specific value for a UE capable of a corresponding function. For example, if the CQI reporting is transmitted as many times as the number of repetitions of the CQI reporting, the UE may perform switching/fallback/conversion in a CQI reporting period of a normal period (or a period longer than a short period for indicating/informing SCell activation to the BASE STATION) in the activation state.

As another example, when receiving a MAC CE indicating SCell activation, the UE reports the CQI through a short CQI reporting period. When receiving resource allocation (ex, DL allocation, UL grant) for a corresponding SCell form the BASE STATION, the UE may perform switching/fallback/conversion in a CQI reporting period of a normal period in the activation state.

As another example, when receiving a MAC CE indicating SCell activation, the UE reports the CQI through a short CQI reporting period. When a specific subframe is exceeded in a subframe(s) that has received a MAC CE, the UE may perform switching/fallback/conversion in a CQI reporting period of a normal period in the activation state. After having received the SCell activation indication, the corresponding specific subframe may be 24 or 34 subframes in which SCell activation operation is applied. The corresponding subframe is configured on a UE by a base station, or may be pre-configured with a specific value for a UE capable of a corresponding function.

As another example, when receiving a MAC CE indicating SCell activation, the UE reports the CQI through a short CQI reporting period. The UE may perform switching/fallback/conversion in a CQI reporting period of a normal period in the activation state at a time corresponding to the minimum value/time of the operation/method/time.

As described above, the UE configures a period parameter for CQI reporting in the dormant state separated from a period parameter for CQI reporting in the activation state, or a period parameter for CQI reporting of a shorter period, and may transmit a CQI report according to the corresponding configuration and a state of the SCell. In addition, the CQI reporting period may be changed according to methods described above.

Embodiments of a more detailed method of indicating the state of a SCell through the MAC CE described above are separately described hereafter.

A base station may transmit a MAC CE for indicating the dormant state for one or more SCells to a UE.

Embodiment 1: A Method of Indicating the Dormant State Using a R Bit in the MAC CE Field For example, the base station may utilize a typical activation/deactivation MAC CE (or a typical activation/deactivation MAC CE format) to indicate the dormant state for a SCell configured on a UE. For example, the indication will be given as follows.

The R field is set to 1 to indicate the dormant state that is distinct from the activation state.

If the R field is set to 1, the Ci field is set to 1 to indicate that a SCell with SCellIndex i shall be hibernated in the dormant state. If it is set to 0 to indicate that the SCell with the SCellIndex i shall be hibernated in the dormant state, the remaining states are set to 1.

At this time, in one example, if the R field is set to 1, the Ci field is set to 0 to indicate that the SCell with the SCellIndex i shall be deactivated.

At this time, as another example, if the R field is set to 1, the Ci field is set to 0 to indicate that the SCell with the SCellIndex i shall be activated.

At this time, as another example, regardless of the R field, the Ci field is set to 0 to indicate that the SCell with the SCellIndex i shall be deactivated.

In this case, as another example, LCID values may be used with the same values as the typical activation/deactivation MAC CE (for example, in the case of the activation/deactivation MAC CE of 1 octet, the LCID value of 11011, and in the case of the activation/deactivation MAC CE of 4 octets, the LCID value of 11000).

As another example, information i) on, ii) for indicating/enabling/configuring the operations described above may be configured on the UE through an RRC reconfiguration message.

Embodiment 2: A Method of Indicating the Dormant State Using One (or a Specific Bit) of the Ci Fields in the MAC CE Field In one example, the base station may utilize a typical activation/deactivation MAC CE (or a typical activation/deactivation MAC CE format) to indicate the dormant state for a SCell configured on a UE.

As one example, one field or bit in an activation/deactivation MAC CE may be used to indicate the dormant that is distinct from the activation state. For example, the corresponding field or bit is set to 1.

As another example, one specific Ci in the activation/deactivation MAC CE may be used to indicate the dormant that is distinct from the activation state. For example, the corresponding field or bit is set to 1 (or a dedicated value).

As another example, a field or bit for indicating this may be configured on the UE through an RRC connection reconfiguration message. As another example, information i) on, ii) for indicating/enabling/configuring such an operation may be configured on the UE through an RRC connection reconfiguration message. As another example, information i) on, ii) for indicating/enabling/configuring such an operation may be configured on the UE through an RRC connection reconfiguration message. For another example, the BASE STATION does not configure a SCell having a Scell index or a servecell index of a corresponding field on the UE. As a result, the corresponding index may be utilized as a field or bit for indicating the dormant state.

If the field or bit for indicating the dormant state is set to 1, the remaining fields or the Ci fields that are not fields/bits for indicating the dormant state are set to 1 in order to indicate that the SCell with SCellIndex i shall be hibernated in the dormant state. If it is set to 0 to indicate that the SCell with the SCellIndex i shall be hibernated, the remaining states are set to 1.

At this time, in one example, if the field or bit for indicating the dormant state is set to 1, the remaining fields or the Ci fields that are not fields/bits for indicating the dormant state are set to 0 in order to indicate that the SCell with the SCellIndex i shall be deactivated.

At this time, as another example, if the field or bit for indicating the dormant state is set to 1, the remaining fields or the Ci fields that are not fields/bits for indicating the dormant state are set to 0 in order to indicate that the SCell with the SCellIndex i shall be activated.

At this time, as another example, regardless of the field or bit for indicating the dormant state, the remaining fields or the Ci fields that are not fields/bits for indicating the dormant state are set to 0 in order to indicate that the SCell with the SCellIndex i shall be deactivated.

In this case, as another example, LCID values may be used with the same values as the typical activation/deactivation MAC CE (for example, in the case of the activation/deactivation MAC CE of 1 octet, the LCID value of 11011, and in the case of the activation/deactivation MAC CE of 4 octets, the LCID value of 11000).

Embodiment 3: A Method of Indicating the Dormant State Using a Reserved LCID Value As described above, for example, a new LCID distinct from the LCID of the typical activation/deactivation MAC CE may be assigned to indicate the dormant state.

For example, the base station may utilize the same format as the typical activation/deactivation MAC CE to indicate the dormant state for the SCell configured in a UE, but assign a LCID distinct from the LCID of the typical activation/deactivation MAC CE. For example, the indication will be given as follows.

Here, if there is a SCell configured with a SCell index (SCellIndex) i, this corresponding Ci field indicates the dormant state of a SCell configured with the SCellIndex i. Otherwise, the MAC entity shall ignore the Ci field. For example, the Ci field is set to 1 in order to indicate that a SCell having the SCellIndex i is required to transition to the dormant state. The Ci field is set to 0 in order to indicate that a SCell having the SCellIndex i is required to be deactivated.

As another example, the Ci field is set to 1 in order to indicate that a SCell having the SCellIndex i is required to transition to the dormant state. The Ci field is set to 0 in order to indicate that a SCell having the SCellIndex i is required to be activated.

As another example, the Ci field is set to 0 in order to indicate that a SCell having the SCellIndex i is required to transition to the dormant state. The Ci field is set to 1 in order to indicate that a SCell having the SCellIndex i is required to be activated.

The R field is set to 0 as a reserved bit.

Meanwhile, it is possible to i) define a dormant/activation MAC CE and a dormant/deactivation MAC CE, ii) assign a new LCID distinct from the LCID of the typical activation/deactivation MAC CE, and therefore iii) indicate dormancy/activation and dormancy/deactivation, respectively.

In the case of the dormant/activation MAC CE, if there is a SCell configured with a SCell index (SCellIndex) i, this corresponding Ci field indicates the dormant state of a SCell configured with the SCellIndex i. Otherwise, the MAC entity shall ignore the Ci field. For example, the Ci field is set to 1 in order to indicate that a SCell having the SCellIndex i is required to transition to the dormant state. The Ci field is set to 0 in order to indicate that a SCell having the SCellIndex i is required to be activated.

In the case of the dormant/deactivation MAC CE, if there is a SCell configured with a SCell index (SCellIndex) i, this corresponding Ci field indicates the dormant state of a SCell configured with the SCellIndex i. Otherwise, the MAC entity shall ignore the Ci field. For example, the Ci field is set to 1 in order to indicate that a SCell having the SCellIndex i is required to transition to the dormant state. The Ci field is set to 0 in order to indicate that a SCell having the SCellIndex i is required to be deactivated.

As another example, the Ci field is set to 1 in order to indicate that a SCell having the SCellIndex i is required to transition to the dormant state. The Ci field is set to 0 in order to indicate that a SCell having the SCellIndex i is required to be in another state other than the dormant state. If the corresponding MAC CE is intended to indicate a transition between the dormant state and the activation state, a UE (MAC entity, hereinafter, the UE may be referred to as a MAC entity) transitions to or maintains the dormant state when a SCell in the activation state (or dormant state) is instructed to be in the dormant state (set to "1"). When the cell in the dormant state (or activation state) is instructed to be in the activation state (set to "0"), the UE transitions to or maintains the activation state. When a cell in the deactivation state is indicated by a corresponding MAC CE, the UE may ignore the corresponding Ci field.

If the corresponding MAC CE is intended to indicate a transition between the dormant state and the deactivation state, the UE transitions to or maintains the dormant state when a SCell in the deactivation state (or dormant state) is instructed to be in the dormant state (set to "1"). When the cell in the dormant state (or deactivation state) is instructed to be in the deactivation state (set to "0"), the UE transitions to or remains the deactivation state. When a cell in the activation state is indicated by a corresponding MAC CE, the UE may ignore the corresponding Ci field.

As another example, the MAC CE may be one MAC CE and may include a 1-bit field for distinguishing whether the corresponding MAC CE is for indicating a transition between the dormant state and the activation state, or a transition between the dormant state and the deactivation state.

Embodiment 4: A Method of Indicating a Dormant State MAC CE Using One LCID Field As shown in FIG. 7, in the typical LTE technology, the LCID value is formed of 5 bits. Therefore, logical channels, MAC CEs, padding, and the like are required to be divided into 32 or less. However, the number of remaining spare bits is not large. Thus, it may be a waste to i) use, for a dormant MAC CE, two dormant MAC CEs for both one octet and four octets or ii) define a new LCID for a dormant/deactivation MAC CE or a dormant/activation MAC CE.

For example, it is possible to define a dormant MAC CE format of 1 octet to 4 octets, or a MAC CE format for indicating activation/deactivation, using one LCID. That is, it is possible to define a dormant MAC CE format of varying length or a MAC CE format for indicating activation/deactivation, through one MAC CE format.

For example, a MAC CE format may include a field/bit to indicate whether a CSi field equal to or more than a specific number (for example, 6 bits or 7 bits) (or a serving cell index) is included. If the field/bit is set to 1 (or 0), Ci fields (or serving cell indexes) may be included up to another specific number 9 e.g., 23 bits or 24 bits).

As described above, the MAC CE may include indication information configured in various types and indicating a SCell state. The embodiments described above may be performed independently or in partial/entire combination.

Hereafter, various embodiments of a method of configuring a SCell state using a timer when a UE configures the state of a SCell in accordance with the various methods described above are described in detail.

When a MAC entity receives a MAC CE for transitioning a SCell to a dormant state at transmission time intervals (TTI) for each TTI and each SCell, a dormant SCell deactivation timer associated with corresponding SCells is started or restarted at the TTI or a TTI according to the timing described above. A TTI or a transmission unit is referred to as a TTI for the convenience of description herein, but any transmission unit such as a slot, a mini slot, an n symbol (n is any transmission unit such as a natural number) is included.

Hereafter, the configuration and the operation method of a timer according to state configuration of a SCell are described through separate embodiments.

First, an embodiment of a deactivation timer for instructing a UE in a dormant state to transition to a deactivation state in accordance with an operation of a timer is described.

Method of Maintaining a Timer for State Change for Each SCell Configured in a UE A timer for performing state transition from a dormant state to a deactivation state may be provided for each SCell configured in a UE. The timer configured herein may denote a dormant SCell deactivation timer or a SCell deactivation timer to be described below. Therefore, the names of timers are not limited and are referred to as deactivation timers in the following description of this embodiment.

For example, a MAC entity may maintain a deactivation timer for each configured SCell for SCells in a dormant state. A UE deactivates a SCell associated with expiration of a corresponding timer. At this time, a SCell in which a PUCCH is configured may be intended not to maintain a deactivation timer of a UE in a dormant state. A deactivation timer may not be applied to the SCell in which a PUCCH is configured, even in an activation state. SCell in which a PUCCH is configured is a specific cell that needs to transmit uplink control information and application of a timer may be differently applied from common SCells in which a PUCCH transmission function is not configured.

As another example, a MAC entity may maintain a deactivation timer for each configured SCell, for SCells in a dormant state. A UE deactivates a SCell associated with expiration of a corresponding timer. The deactivation timer of a UE in a dormant state may be maintained in the same way for the SCell in which a PUCCH is configured. When a PUCCH SCell is configured in an activation state, it may be deactivated only by a network instruction. However, in the dormant state, the PDCCH is monitored or user data is not transmitted, so a deactivation timer may also be applied to the PUCCH SCell similar to common SCells.

For these operations, when a SCell is configured in a UE, when an RRC connection reconfiguration message including SCell configuration information is indicated to a UE, or when an RRC connection reconfiguration message including dormant state configuration information for a SCell is indicated to a UE, a base station may transmit a deactivation timer for instructing a corresponding SCell to transit to a deactivation state after a specific time. For example, the deactivation timer may be included in a parameter configured for deactivation transition of a SCell in a dormant state. The deactivation timer may be included as one parameter that is individually applied to all SCells. Alternatively, the deactivation timer may be included as an individual parameter that is individually applied to each SCell. Alternatively, the deactivation timer may also be included as a parameter that is applied to each of specific SCells or each group of specific SCells.

Whether a deactivation timer is configured for each SCell, which parameters the deactivation timer is indicated by, and whether the deactivation timer is applied to a PUCCH SCell were described in detail above.

Hereafter, whether the deactivation timer described above is distinct for each state of a UE or is used in the same way is separately described through embodiments.

Method of Applying Same Deactivation Timer in an Activation State and a Dormant State A UE may use a SCell deactivation timer for performing transition to a deactivation state from an activation state indicated through an RRC reconfiguration message in the same way in a dormant state.

The SCell deactivation timer denotes a parameter configured for deactivation transition of a SCell in an activation state when a UE is configured to have a PSCell and one or more SCells that is not a PUCCH SCell. If there is no SCell deactivation timer field, the UE shall remove any value existing for the field and set the value as infinite.

The dormant state is a new state distinct from the activation state in which the deactivation timer is operated. However, the purpose of the deactivation timer for transitioning from the dormant state to the deactivation state is also to be used for deactivation state transition of a SCell, so a typical SCell deactivation timer may be used in the same way not to cause additional parameter definition and a corresponding increase of signaling.

For example, a MAC entity applies a SCell deactivation timer configured through RRC for SCells in the dormant state. In this case, the SCell deactivation timer may be configured and maintained for each SCell.

If a MAC entity receives a MAC CE for transitioning a SCell to the dormant state at specific TTI, the MAC entity starts or restarts the SCell deactivation timer associated with a corresponding SCell at the TTI where it receives the MAC CE or a TTI according to the timing describe above. In addition, when the SCell deactivation timer is expired, the associated SCell may be deactivated.

Method of Applying Different Deactivation Timers in an Activation State and a Dormant State A SCell deactivation timer that is applied in the activation state had a value of a wireless frame unit. For example, the value of a SCell deactivation timer was selected from ENUMERATED {rf2, rf4, rf8, rf16, rf32, rf64, rf128, spare}.

However, a deactivation timer indicating transition from the dormant state to the deactivation state needs to be configured different from a timer of the activation state. This is because it is required to prevent unnecessary power consumption by configuring the SCell deactivation timer in a shorter unit than the wireless frame unit, and the fact that a SCell was configured in the dormant state may mean that the possibility of addition data generation is low.

Therefore, a UE may separately configure and apply a dormant SCell deactivation timer that is applied in a dormant state and distinct from the SCell deactivation timer that is applied in the activation state.

For example, the dormant SCell deactivation timer that is applied in the dormant state may be configured as a timer having a different range of values distinct from the value of the SCell deactivation timer to be deactivated within shorter time than the SCell deactivation timer. Alternatively, the dormant SCell deactivation timer that is applied in the dormant state consumes less power than in the typical activation state, it may be configured as a timer having a different range of values to be deactivated within longer time than the SCell deactivation timer.

As another example, the dormant SCell deactivation timer that is applied in the dormant state may be configured as only one value for a PSCell and one or more SCells that is not a PUCCH SCell. That is, the dormant SCell deactivation timer may be applied to all SCells.

As another example, the dormant SCell deactivation timer that is applied in the dormant state may be configured as only one value for one or more SCells that is not a PSCell. Alternatively, the dormant SCell deactivation timer that is applied in the dormant state may be configured to have a specific value for a PUCCH SCell.

As another example, the dormant SCell deactivation timer that is applied in the dormant state may be configured for each SCell. Accordingly, the value of the dormant SCell deactivation timer may be differently configured in accordance with the characteristics of different SCells such as a coverage. For example, the value that the dormant SCell deactivation timer may have to reduce signaling overhead may be limited to 2 bits or 4 bits.

As another example, when a field including the dormant SCell deactivation timer does not exist in a message for configuring the dormant SCell deactivation timer in a UE, the UE may set the dormant SCell deactivation timer value as infinite. Alternatively, when dormant SCell deactivation timers are configured for each SCells, one of the dormant SCell deactivation timer values may be set to infinite. If there is no dormant SCell deactivation timer field, the UE shall remove any value existing for the field and set the value as infinite.

As described above, a MAC entity may maintain dormant SCell deactivation timers, which are distinct from a SCell deactivation timer configured through an RRC message, for each SCell, for SCells in the dormant state. If a MAC entity receives a MAC CE for transitioning a SCell to the dormant state at specific TTI, the MAC entity starts or restarts the dormant SCell deactivation timer associated with a corresponding SCell at the TTI or a TTI according to the timing describe above. In addition, when the SCell deactivation timer is expired, the UE may deactivate the associated SCell.

Alternatively, when the UE receives information indicating the activation state for a SCell through a MAC CE, the UE stops/interrupts a dormant SCell deactivation timer associated with the corresponding SCell if the dormant SCell deactivation timer is in operation.

Alternatively, when the UE receives information indicating the deactivation state for a SCell through a MAC CE, the UE stops/interrupts a dormant SCell deactivation timer associated with the SCell if the dormant SCell deactivation timer is in operation.

Hereafter, an embodiment of a timer configured for transition from the activation state to the dormant state and distinct from a timer for transition from the dormant state to the deactivation state described above is described.

Method of Configuration a Timer for Transitioning a SCell from an Activation State to a Dormant State.

Since a SCell has only the activation state, the deactivation state, and a release state in the CA technology of the related art, a SCell in the activation state may be transitioned or released to the deactivation state. However, if the dormant state is introduced and configured in a new sate of a SCell by necessity of the dormant state, a SCell in the activation state may be configured into the dormant state by an RRC message or a MAC CE. As described above, the dormant sate may be used when there is no data to be transmitted now through an activated SCell by a base station but the base station needs to transmit/receive through rapid activation if data is generated later. In this case, there may be a need for a timer for transitioning a SCell in the activation state to the dormant state. That is, when predetermined time passes in the activation state regardless of clear dormant state transition through the MAC CE, there may be a need for a specific timer that transitions to the dormant state. Accordingly, it is possible to achieve an effect that may reduce/remove unnecessary MAC CE signaling.

A timer for instructing a SCell in the activation state to transition to the dormant state is described as a SCell dormant timer hereafter. As described above, this term is used for distinction from other timers, and the embodiments of the present disclosure are not limited thereto.

A base station may instruct a UE by including a SCell dormant timer for transitioning a SCell in the activation state to the dormant state into an RRC reconfiguration message.

For example, if a MAC entity receives a MAC CE for transitioning a SCell to the activation state at specific TTI, the MAC entity starts or restarts the SCell dormant timer associated with a corresponding SCell at the corresponding specific TTI or a TTI according to the timing describe above.

As another example, if the MAC entity receives a MAC CE for transitioning a SCell to the activation state at a specific TTI, a UE may check whether a SCell dormant timer was configured. If the SCell dormant timer was configured, the UE starts or restarts a SCell dormant timer associated with a corresponding SCell at the specific corresponding TTI or a TTI according to the timing described above.

As another example, if uplink grant or downlink assignment is indicated on an activated SCell or uplink grant or downlink assignment is indicated for an activated SCell on a serving cell that schedules an activated SCell, a SCell dormant timer associated with a corresponding SCell may be restarted. That is, when generation of specific data is estimated or occurs with a SCell dormant timer in operation, the UE may delay the time to transition to the dormant state by restarting the SCell dormant timer because the UE needs to maintain the activation state.

Meanwhile, an embodiment of not state transition through a specific timer for each SCell, but changing the state of a SCell on the basis of a DRX parameter is described hereafter.

The dormant state may be used to reduce power consumption by a UE and rapidly transmitting data using a SCell. However, if there is no uplink/downlink data to be transmitted, it is not require to keep the dormant state for a long time without using a Connected mode DRX function. When the Connected mode DRX function is used, if there is no sufficient data to be transmitted through a SCell for DRX On duration (or active time), only a PCell may be ON duration and a SCell may remain in the dormant state.

As another example, if there is no data that is transmitted/received for a DRX period or for a specific multiple of the DRX period, a corresponding SCell may transition to the deactivation state.

As another example, if there is no data that is transmitted/received for a DRX onduration timer or for a specific multiple of the DRX onduration timer, a corresponding SCell may transition to the deactivation state.

As another example, if data is not transmitted/received through a SCell until a DRX inactivity timer is expired, a corresponding SCell may transition to a deactivation timer.

As described above, various embodiments were described as clear methods and implicit methods of changing the state of a SCell (of using a timer) when the SCell is configured in a UE and a dormant state is newly defined. A UE may reduce activation delay of a SCell and rapidly transmit data through a SCell by effectively using and controlling the dormant state through the embodiments of the present disclosure.

The operation of a base station that may perform some of or the entire embodiments and operations described above is described hereafter with reference to drawings.

Figure 12:
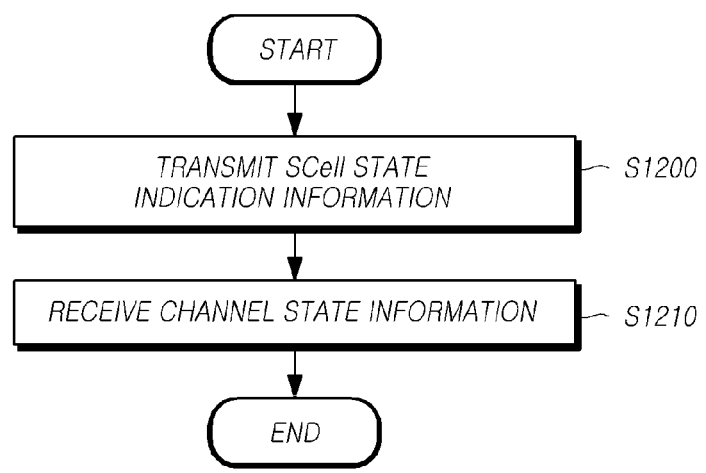
FIG. 12 is a flowchart illustrating operations of a base station according to at least one embodiment of the present disclosure.

FIG. 12 is a flowchart illustrating operations of a base station according to an embodiment of the present disclosure.

Referring to FIG. 12, a base station controlling a state for a SCell of a UE may perform operations for transmitting SCell state indication information indicating a state for the SCell to the UE through an RRC message or a MAC CE (S1200).

For example, the base station may transmit the SCell state indication information through higher layer signaling or a MAC CE. The higher layer signaling may denote an RRC message. The higher layer signaling and the MAC CE may be transmitted depending on a situation such as whether the UE configures a SCell.

In one example, the base station may include SCell state indication information in an RRC connection reconfiguration message for configuring a SCell. For example, the SCell state indication information transmitted through the RRC message may include a 1-bit parameter indicating the activation state or the dormant state. If configuration information for configuring the SCell is contained in the RRC message, but a parameter for the SCell state indication information is not contained in the configuration information, the UE may configure the SCell to be in the deactivation state. Thereafter, the base station may control a state of the SCell of the UE according to SCell state indication information transmitted through the MAC CE.

As another example, after having configured the SCell, the base station may dynamically transmit state indication information for the SCell through the SCell state indication information through the MAC CE. For example, the MAC CE including the SCell state indication information may be configured in a format including a field for indicating a state for the SCell as the activation state or the dormant state for each SCell index. As another example, the MAC CE including the SCell state indication information may be configured in a format including a field for indicating a state for the SCell as the activation state or the deactivation state for each SCell index.

In other words, the MAC CE may be divided into a first MAC CE configured to indicate a state for each SCell index as the activation state or the deactivation state, and a second MAC CE configured to indicate a state for each SCell index as the dormant state or the activation state. In this case, the first MAC CE and the second MAC CE are identified by one or more MAC PDU subheaders having logical channel IDs (LCID) different from each other. For example, the first MAC CE may be identified by a MAC PDU subheader having an activation or deactivation LCID value. The second MAC CE may be identified by a MAC PDU subheader having a hibernation LCID value. Thus, the first MAC CE and the second MAC CE are arbitrary terms for dividing the MAC CE, and not limited thereto. That is, the first MAC CE may be described as an activation/deactivation MAC CE, and the second MAC CE may be described as a hibernation MAC CE.

In addition, when the state of the SCell is configured in an activation state or a dormant state on the basis of the SCell state indication information, the base station may perform operations for receiving channel state information for the SCell in accordance with CQI configuration information for the SCell (S1210).

For example, when the state of the SCell is configured in an activation state and first CQI configuration information for the SCell is configured in the UE, the base station may receive channel state information for the SCell in accordance with the value of a first activation state CQI report parameter contained in the first CQI configuration information.

As another example, the state of the SCell is configured in an activation state or first CQI configuration information is not configured in the UE, the base station may receive channel state information for the SCell in accordance with the value of a second CQI report parameter contained in the second CQI configuration information.

As another example, when the base station receives channel state information in accordance with the first CQI configuration information and the first CQI information configured in the UE is expired, the base station may receive channel state information in accordance with second CQI configuration information.

As another example, when the state of the SCell is configured in a dormant state, the base station may receive the channel information for the SCell in accordance with a CQI report parameter value contained in dormant state CQI configuration information discriminated from the first CQI configuration information and the second CQI configuration information that is applied in the activation state.

Here, at least one of the first CQI configuration information and the second CQI configuration information may be transmitted to the UE through higher layer signaling (e.g., an RRC message). Further, the first CQI configuration information and the second CQI configuration information include different CQI report periods and offset values, and the CQI report period contained in the first CQI configuration information may be set as a shorter value than the CQI report period contained in the second CQI configuration information. For example, the first CQI configuration information may denote cqi-ShortConfigSCell information and the second CQI configuration information may mean cqi-ReportConfigSCell information. Both the cqi-ShortConfigSCell information and the cqi-ReportConfigSCell information denote information elements on an RRC message, and the embodiments of the present disclosure are not limited thereto.

In addition, the base station may perform the operations of the embodiments described with reference to FIGS. 1 to 11, and to do this, specific steps may be added, omitted, and integrated.

Hardware structures of a UE and a base station for performing the operations described above are described again with reference to drawings.

Figure 13:
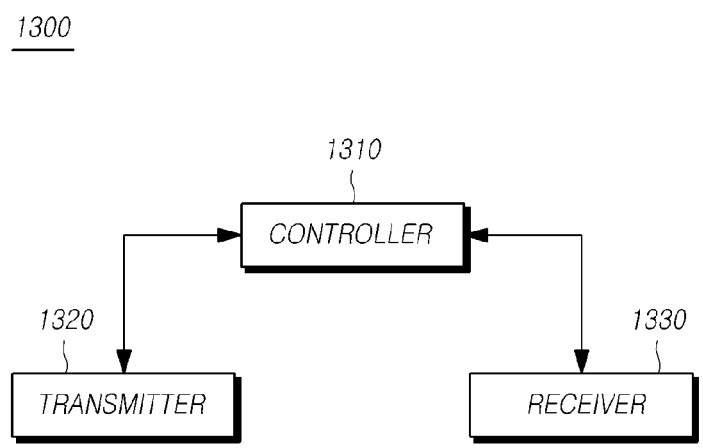
FIG. 13 is a block diagram illustrating a user equipment according to at least one embodiment of the present disclosure.

FIG. 13 is a block diagram illustrating a UE according to at least one embodiment of the present disclosure.

Referring to FIG. 13, a UE 1300 controlling states of a SCell may include a receiver 1330 configured to receive SCell state indication information for indicating a state for the SCell from a base station through an RRC message or a MAC control element, a controller 1310 configuring the state of the SCell in an activation state or a dormant state on the basis of the SCell state indication information, and a transmitter 1320 configured to transmit channel state information for the SCell to a base station in accordance with CQI configuration information configured for the SCell.

For example, the receiver 1330 may receive SCell state indication information through higher layer signaling or a MAC CE. The higher layer signaling may denote an RRC message. The higher layer signaling and the MAC CE may be received depending on a situation such as whether the UE configures a SCell.

In one example, the SCell state indication information may be contained in an RRC connection reconfiguration message that the receiver 1330 receives for configuring a SCell. For example, the SCell state indication information received through the RRC message may include a 1-bit parameter indicating the activation state or the dormant state. If configuration information for configuring the SCell is contained in the RRC message, but a parameter for the SCell state indication information is not contained in the configuration information, the UE may configure the SCell to be in the deactivation state. Thereafter, the UE may control a state of the SCell according to SCell state indication information received through the MAC CE.

As another example, with the SCell configured, the receiver 1330 may dynamically receive state indication information for the SCell through the SCell state indication information by the MAC CE. For example, the MAC CE including the SCell state indication information may be configured in a format including a field for indicating a state for the SCell as the activation state or the dormant state for each SCell index. As another example, the MAC CE including the SCell state indication information may be configured in a format including a field for indicating a state for the SCell as the activation state or the deactivation state for each SCell index.

In other words, the MAC CE may be divided into a first MAC CE configured to indicate a state for each SCell index as the activation state or the deactivation state, and a second MAC CE configured to indicate a state for each SCell index as the dormant state or the activation state. In this case, the first MAC CE and the second MAC CE are identified by one or more MAC PDU subheaders having logical channel IDs (LCID) different from each other. For example, the first MAC CE may be identified by a MAC PDU subheader having an activation or deactivation LCID value. The second MAC CE may be identified by a MAC PDU subheader having a hibernation LCID value. Thus, the first MAC CE and the second MAC CE are arbitrary terms for dividing the MAC CE, and not limited thereto. That is, the first MAC CE may be described as an activation/deactivation MAC CE, and the second MAC CE may be described as a hibernation MAC CE.

Meanwhile, the controller 1310 performs various operations in accordance with the state of a SCell.

For example, when the SCell state indication information indicates an activation state, the controller 1310 may configure the SCell in the activation state. Further, when the controller 1310 configures the SCell in the activation state and when a SCell dormant timer is configured in association with the SCell, the controller 1310 may start or restart the SCell dormant timer. Further, when the SCell dormant timer associated with the SCell is expired, the controller 1310 may change the state of the SCell into a dormant state. When the state of the SCell is configured in the dormant state by expiration of the SCell dormant timer, the controller 1310 may stop a SCell deactivation timer associated with the SCell.

As another example, when the SCell state indication information indicates a dormant state, the controller 1310 may configure the SCell in the dormant state. Further, when the controller 1310 configures the SCell in the dormant state, the controller 1310 may stop the SCell deactivation timer associated with the SCell. Further, when the controller 1310 configures the SCell in the dormant state and a dormant SCell deactivation timer is configured in relation to the SCell, the controller 1310 may start or restart the dormant SCell deactivation timer.

Meanwhile, the dormant SCell deactivation timer may not apply to a SCell set to transmit a control signal to an uplink.

The transmitter 1320 may transmit channel state information on the basis of various periods and offsets to the base state in accordance with the CQI configuration information in each state.

For example, when the SCell is configured in an activation state and first CQI configuration information for the SCell is configured in the UE, the transmitter 1320 may transmit channel state information for the SCell to a base station by applying the value of a first activation state CQI report parameter contained in the first CQI configuration information.

As another example, the SCell is configured in an activation state and first CQI configuration information is not configured in the UE, the transmitter 1320 may transmit channel state information for the SCell to the base station by applying the value of a second CQI report parameter contained in the second CQI configuration information.

At least one of the first CQI configuration information and the second CQI configuration information may be configured in the UE through higher layer signaling (e.g., an RRC message). Further, the first CQI configuration information and the second CQI configuration information include different CQI report periods and offset values, and the CQI report period contained in the first CQI configuration information may be set as a shorter value than the CQI report period contained in the second CQI configuration information. For example, the first CQI configuration information may denote cqi-ShortConfigSCell information and the second CQI configuration information may mean cqi-ReportConfigSCell information. Both the cqi-ShortConfigSCell information and the cqi-ReportConfigSCell information denote information elements on an RRC message and the terms are not limited.

When the transmitter 1320 transmits the channel state information in accordance with the first CQI configuration information and the first CQI configuration information is expired, the transmitter 1320 can transmit channel state information in accordance with the second CQI configuration information. For example, when the number of a subframe receiving SCell state indication information indicating an activation state for the SCell is n, the first CQI configuration information may be expired at a transmission time interval (TTI) including the n+34 subframe. In this case, the transmitter 1320 may transmit the channel state information in the activation state to the base station in accordance with the second CQI configuration information.

As another example, when the SCell is configured in a dormant state, the transmitter 1320 may transmit the channel information for the SCell to the base station in accordance with a CQI report parameter value contained in dormant state CQI configuration information discriminated from the first CQI configuration information and the second CQI configuration information that is applied in the activation state.

In addition, the controller 1310 controls general operations of the UE 1300 required for performing detailed signaling and operations for state transition of a SCell for performing the present disclosure described above.

The transmitter 1320 and the receiver 1330 are used to transmit/receive signals or messages, and data for achieving the method and system of the present disclosure to/from a base station.

Figure 14:
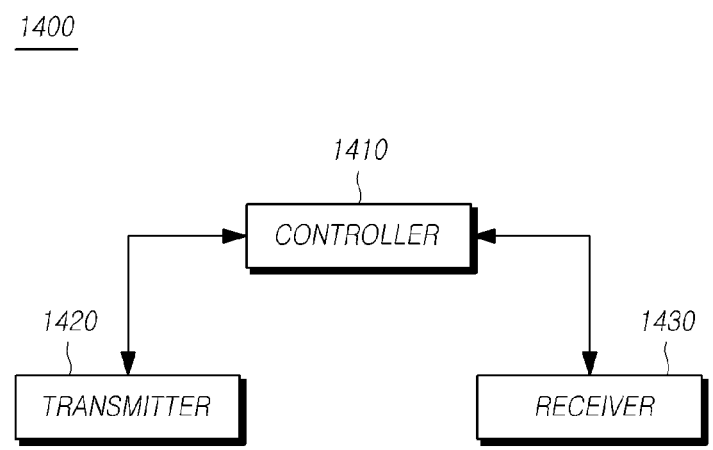
FIG. 14 is a block diagram illustrating a base station according to at least one embodiment of the present disclosure.

FIG. 14 is a block diagram illustrating a base station according to at least one embodiment of the present disclosure.

Referring to FIG. 14, a base station 1400 controlling states of a SCell may include a transmitter 1420 configured to transmit SCell state indication information indicating a state for the SCell to a UE through an RRC message or a MAC control element, and a receiver 1430 configured to receive channel state information for the SCell in accordance with CQI configuration information configured for the SCell when the state of the SCell is configured in an activation state or a dormant state on the basis of the SCell state indication information.

For example, the transmitter 1420 may transmit SCell state indication information through higher layer signaling or a MAC CE. The higher layer signaling may denote an RRC message. The higher layer signaling and the MAC CE may be transmitted depending on a situation such as whether the UE configures a SCell.

In one example, the transmitter 1420 may include SCell state indication information in an RRC connection reconfiguration message for configuring a SCell. For example, the SCell state indication information transmitted through the RRC message may include a 1-bit parameter indicating the activation state or the dormant state. If configuration information for configuring the SCell is contained in the RRC message, but a parameter for the SCell state indication information is not contained in the configuration information, the UE may configure the SCell to be in the deactivation state. Thereafter, the transmitter 1420 may control a state of the SCell of the UE according to SCell state indication information transmitted through the MAC CE.

As another example, after having configured the SCell, the transmitter 1420 may dynamically transmit state indication information for the SCell through the SCell state indication information through the MAC CE. For example, the MAC CE including the SCell state indication information may be configured in a format including a field for indicating a state for the SCell as the activation state or the dormant state for each SCell index. As another example, the MAC CE including the SCell state indication information may be configured in a format including a field for indicating a state for the SCell as the activation state or the deactivation state for each SCell index.

In other words, the MAC CE may be divided into i) a first MAC CE configured to indicate a state for each SCell index as the activation state or the deactivation state, and ii) a second MAC CE configured to indicate a state for each SCell index as the dormant state or the activation state. In this case, the first MAC CE and the second MAC CE are identified by one or more MAC PDU subheaders having logical channel IDs (LCID) different from each other. For example, the first MAC CE may be identified by a MAC PDU subheader having an activation or deactivation LCID value. The second MAC CE may be identified by a MAC PDU subheader having a hibernation LCID value. Thus, the first MAC CE and the second MAC CE are arbitrary terms for dividing the MAC CE. The embodiments of the present disclosure are not limited thereto. That is, the first MAC CE may be described as an activation/deactivation MAC CE, and the second MAC CE may be described as a hibernation MAC CE.

Meanwhile, the receiver 1430 may receive channel state information for a SCell on the basis of timing according to CQI configuration information. The channel state information may be received through a PCell, a PSCell, or a PUCCH SCell.

For example, when the state of the SCell is configured in an activation state and first CQI configuration information for the SCell is configured in the UE, the receiver 1430 may receive channel state information for the SCell in accordance with the value of a first activation state CQI report parameter contained in the first CQI configuration information.

As another example, the state of the SCell is configured in an activation state or first CQI configuration information is not configured in the UE, the receiver 1430 may receive channel state information for the SCell in accordance with the value of a second CQI report parameter contained in the second CQI configuration information.

As another example, when the base station receives channel state information in accordance with the first CQI configuration information and the first CQI information configured in the UE is expired, the receiver 1430 may receive channel state information in accordance with second CQI configuration information.

As another example, when the state of the SCell is configured in a dormant state, the receiver 1430 may receive the channel information for the SCell in accordance with a CQI report parameter value contained in dormant state CQI configuration information discriminated from the first CQI configuration information and the second CQI configuration information that is applied in the activation state.

Here, at least one of the first CQI configuration information and the second CQI configuration information may be transmitted to the UE through higher layer signaling (e.g., an RRC message). Further, the first CQI configuration information and the second CQI configuration information include different CQI report periods and offset values, and the CQI report period included in the first CQI configuration information may be set as a shorter value than the CQI report period contained in the second CQI configuration information. For example, the first CQI configuration information may denote cqi-ShortConfigSCell information and the second CQI configuration information may mean cqi-ReportConfigSCell information. Both the cqi-ShortConfigSCell information and the cqi-ReportConfigSCell information denote information elements on an RRC message and the terms are not limited.

In addition, the controller 1410 controls general operations of the base station 1400 required for performing detailed signaling and operations for state transition of a SCell for performing the present disclosure described above.

The transmitter 1420 and the receiver 1430 are used to transmit/receive signals or messages, and data for achieving the method and system of the present disclosure to/from a UE.

The embodiments described above may be supported by the standard documents disclosed in at least one of the wireless access systems IEEE 802, 3GPP and 3GPP2. That is, the steps, configurations, and parts not described in the present embodiments for clarifying the technical idea may be supported by standard documents described above. In addition, all terms disclosed herein may be described by the standard documents described above.

The embodiments described above may be implemented by various means. For example, the embodiments of the present disclosure may be implemented by hardware, firmware, software, or a combination thereof.

In the case of hardware implementation, the method according to embodiments may be implemented by one or more of application specific integrated circuits (ASICs), digital signal processors (DSPs), digital signal processing devices (DSPDs), programmable logic devices (PLDs) FPGAs (Field Programmable Gate Arrays), a processor, a controller, a microcontroller, a microprocessor, or the like.

In the case of an implementation by firmware or software, the method according to the embodiments may be implemented in the form of an apparatus, a procedure, or a function for performing the functions or operations described above. The software code may be stored in a memory unit and driven by the processor. The memory may be located inside or outside the processor, and may exchange data with the processor by various well-known means.

The terms "system", "processor", "controller", "component", "module", "interface", "model", "unit", and the like, described above may generally refer to computer-related entity hardware, a combination of hardware and software, software, or software in execution. For example, components described above may be, but are not limited to, a process driven by a processor, a processor, a controller, a control processor, an entity, an execution thread, a program and/or a computer. For example, an application running on a controller, controller or processor can be a component. One or more components can be included within a process and/or thread of execution, and a component can be placed on one system or be disposed on more than one system.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Accordingly, the embodiments disclosed herein are only for describing, but not limiting, the technical idea of the present disclosure, and the scope of the technical idea of the present disclosure is not limited by the embodiments. The scope of the technical idea of the present disclosure should be construed on the basis of the appended claims in such a manner that all of the technical ideas included in the scope equivalent to the claims fall within the scope of protection of the present disclosure.

What is claimed is:

1. A method of controlling states of a secondary cell (SCell) by a user equipment, the method comprising:
receiving SCell state indication information indicating a state for the SCell from a base station through a radio resource control (RRC) message or a medium access control (MAC) control element;
configuring the state of the SCell in one of an activation state and a dormant state based on the SCell state indication information; and
transmitting channel state information for the SCell to the base station in accordance with channel quality indicator (CQI) configuration information configured for the SCell,
wherein the transmitting comprises:
transmitting channel state information for the SCell to the base station by applying a value of a first activation state CQI report parameter contained in a first CQI configuration information when the first CQI configuration information for the SCell is configured in the user equipment, and transmitting channel state information for the SCell to the base station by applying a value of a second CQI report parameter contained in second CQI configuration information when the first CQI configuration information is not configured in the user equipment, and wherein:
the first CQI configuration information and the second CQI configuration information comprise different CQI report periods and offset values; and
the CQI report period contained in the first CQI configuration information is set as a shorter value than the CQI report period contained in the second CQI configuration information.

2. The method of claim 1, wherein the configuring comprises:
configuring the SCell in the activation state when the SCell state indication information indicates the activation state, and
starts or restarts a SCell dormant timer when the SCell dormant timer is configured in association with the SCell.

3. The method of claim 1, wherein the transmitting comprises transmitting the channel state information in accordance with the second CQI configuration information when the first CQI configuration information is expired and when the channel state information in accordance with the first CQI configuration information is transmitted.

4. The method of claim 3, wherein when the number of a subframe receiving SCell state indication information indicating an activation state for the SCell is n, the first CQI configuration information is expired at a transmission time interval (TTI) comprising an n+34 subframe.

5. The method of claim 2, wherein the configuring comprises changing the state of the SCell into the dormant state and stopping a SCell deactivation timer associated with the SCell when a SCell dormant timer associated with the SCell is expired.

6. The method of claim 1, wherein the configuring comprises:
configuring the SCell in the dormant state when the SCell state indication information indicates the dormant state;
stopping a SCell deactivation timer associated with the SCell; and
starting or restarting a dormant SCell deactivation timer when the dormant SCell deactivation timer is configured in association with the SCell.

7. The method of claim 6, wherein the transmitting comprises transmitting channel state information for the SCell to the base station in accordance with a CQI report parameter value contained in dormant state CQI configuration information distinct from first CQI configuration information and second CQI configuration information that are applied in the activation state.

8. The method of claim 6, wherein the dormant SCell deactivation timer is not applied to a SCell set to transmit an uplink control channel.

9. A method of controlling states of a secondary cell (SCell) of a user equipment by base station, the method comprising:
transmitting secondary cell (SCell) state indication information indicating a state for a SCell to the user equipment through one of a radio resource control (RRC) message and a medium access control (MAC) control element; and
receiving channel state information for the SCell in accordance with channel quality indicator (CQI) configuration information configured for the SCell when the state of the SCell is configured in an activation state or a dormant state on the basis of the SCell state indication information, wherein when the state of the SCell is configured in the activation state, the receiving comprises:
receiving channel state information for the SCell in accordance with a value of a first activation state CQI report parameter contained in a first CQI configuration information when the first CQI configuration information for the SCell is configured in the user equipment, and
receiving channel state information for the SCell in accordance with a value of a second CQI report parameter contained in second CQI configuration information when the first CQI configuration information is not configured in the user equipment, and wherein the receiving comprises receiving the channel state information in accordance with the second CQI configuration information when the first CQI configuration information configured in the user equipment is expired and when the channel state information in accordance with the first CQI configuration information is received.

10. The method of claim 9, wherein when the state of the SCell is configured in the dormant state, the receiving comprises receiving channel state information for the SCell in accordance with a CQI report parameter value contained in dormant state CQI configuration information distinct from first CQI configuration information and second CQI configuration information that are applied in the activation state.

11. A user equipment for controlling states of a secondary cell (SCell) by a user equipment, the user equipment comprising:
a receiver configured to receive SCell state indication information indicating a state for the SCell from a base station through one of a radio resource control (RRC) message and a medium access control (MAC) control element;
a controller configured to control the state of the SCell in one of an activation state and a dormant state based on the SCell state indication information; and
a transmitter configured to transmit channel state information for the SCell to the base station in accordance with channel quality indicator (CQI) configuration information configured for the SCell, wherein the transmitter is configured to:
transmit channel state information for the SCell to the base station by applying a value of a first activation state CQI report parameter contained in a first CQI configuration information when the first CQI configuration information for the SCell is configured in the user equipment; and
transmit channel state information for the SCell to the base station by applying a value of a second CQI report parameter contained in second CQI configuration information when the first CQI configuration information is not configured in the user equipment, and wherein the first CQI configuration information and the second CQI configuration information comprise different CQI report periods and offset values, and the CQI report period contained in the first CQI configuration information is set as a shorter value than the CQI report period contained in the second CQI configuration information.

12. The user equipment of claim 11, wherein the controller is configured to:
- configure the SCell in the activation state when the SCell state indication information indicates the activation state; and
- start or restart a SCell dormant timer when the SCell dormant timer is configured in association with the SCell.

13. The user equipment of claim 11, wherein the transmitter is configured to transmit the channel state information in accordance with the second CQI configuration information when the first CQI configuration information is expired, when the transmitting step transmits the channel state information in accordance with the first CQI configuration information.

14. The user equipment of claim 11, wherein the controller is configured to:
- configure the SCell in the dormant state when the SCell state indication information indicates the dormant state;
- stop a SCell deactivation timer associated with the SCell; and
- start or restart a dormant SCell deactivation timer when the dormant SCell deactivation timer is configured in association with the SCell.

* * * * *